(12) United States Patent
Acciarri et al.

(10) Patent No.: US 11,614,621 B2
(45) Date of Patent: Mar. 28, 2023

(54) USER-WEARABLE SYSTEMS AND METHODS TO COLLECT DATA AND PROVIDE INFORMATION

(71) Applicant: Datalogic IP Tech, S.r.l., Bologna (IT)

(72) Inventors: Claudio Acciarri, Bologna (IT); Raul Avila, Mexico City (MX); Davide Bruni, Bologna (IT); Steven Clapham, Brentwood (GB); Kevin Edward Duffey, Mount Laurel, NJ (US); Reza Ebrahimi, Paris (FR); Eric Freel, Eugene, OR (US); Martin Gebel, Dusseldorf (DE); Jesus Alberto Granado Garcia, Barcelona (ES); John Ingram, Dudley (GB); Jaehoon Lee, Seoul (KR); Kiat Lim, Selangor (MY); Marek Pisecny, Holic (SK); Paul Timmerwilke, Fallbrook, CA (US); Matteo Zanaroli, San Lazzaro di Savena (IT); Ryan Adkins, Waxhaw, NC (US)

(73) Assignee: Datalogic IP Tech, S.r.l., Bologna (IT)

(*) Notice: Subject to any disclaimer, the term of this patent is extended or adjusted under 35 U.S.C. 154(b) by 0 days.

(21) Appl. No.: 16/956,450

(22) PCT Filed: Dec. 18, 2018

(86) PCT No.: PCT/US2018/066327
§ 371 (c)(1),
(2) Date: Jun. 19, 2020

(87) PCT Pub. No.: WO2019/126236
PCT Pub. Date: Jun. 27, 2019

(65) Prior Publication Data
US 2021/0081166 A1 Mar. 18, 2021

Related U.S. Application Data

(60) Provisional application No. 62/607,828, filed on Dec. 19, 2017.

(51) Int. Cl.
*G06F 3/01* (2006.01)
*G06F 3/16* (2006.01)
(Continued)

(52) U.S. Cl.
CPC .......... *G02B 27/017* (2013.01); *G06F 3/013* (2013.01); *G06F 3/017* (2013.01); *G06F 3/0346* (2013.01);
(Continued)

(58) Field of Classification Search
CPC .... G06F 3/01; G06F 3/16; G09G 3/00; G06K 9/00; G06K 9/62; G06K 7/10;
(Continued)

(56) References Cited

U.S. PATENT DOCUMENTS 5,208,449 A 5/1993 Eastman et al.
5,212,372 A 5/1993 Quick et al.
(Continued)

FOREIGN PATENT DOCUMENTS

JP 5247854 B2 4/2013
KR 101502085 B1 3/2015
(Continued)

OTHER PUBLICATIONS

International Search Report and Written Opinion of the International Searching Authority dated Apr. 2, 2019, issued in corresponding International Application No. PCT/US2018/066327, filed Dec. 18, 2018, 25 pages.
(Continued)

Primary Examiner — Chanh D Nguyen
Assistant Examiner — Nguyen H Truong
(74) Attorney, Agent, or Firm — Cozen O'Connor

(57) ABSTRACT

Systems and methods involving one or more wearable components that obtain information about a surrounding environment and provide information to a user to assist user in retrieving objects from the surrounding environment. The
(Continued)

information may include navigation information related to a route that the user may take to retrieve an object, as well as information about the object to be retrieved. The wearable components may be include ones that may be mounted on the head of the user, as well as components that the user may wear on other parts of the body or that attach to clothing. The wearable components may include image sensors, microphones, machine-readable symbol readers, range-finders, accelerometers, and/or gyroscopes that may collect information from and about the surroundings of the user. The wearable components may also include one or more of a set of speakers and/or a display subsystem to provide information to the user.

20 Claims, 11 Drawing Sheets

(51) Int. Cl.
*G02B 27/01* (2006.01)
*G03B 41/06* (2021.01)
*H04N 13/239* (2018.01)
*G06F 3/0346* (2013.01)
*G06K 7/10* (2006.01)
*G06K 7/14* (2006.01)
*G06K 19/07* (2006.01)
*G09G 3/00* (2006.01)
*H04R 1/02* (2006.01)
*G06V 40/16* (2022.01)

(52) U.S. Cl.
CPC .............. *G06F 3/165* (2013.01); *G06F 3/167* (2013.01); *G06K 7/10396* (2013.01); *G06K 7/10891* (2013.01); *G06K 7/1413* (2013.01); *G06K 7/1417* (2013.01); *G06K 19/0709* (2013.01); *G06V 40/168* (2022.01); *G09G 3/001* (2013.01); *H04N 13/239* (2018.05); *H04R 1/028* (2013.01); *G02B 27/0172* (2013.01); *G06K 2007/10534* (2013.01); *G09G 2354/00* (2013.01)

(58) Field of Classification Search
CPC .......... H04N 13/02; H04N 7/18; G01C 21/00; G01C 21/30; G01C 21/34; G01C 21/36; G06T 19/00; G06T 19/20; G06T 7/00; G02B 27/01
See application file for complete search history.

(56) References Cited

U.S. PATENT DOCUMENTS

| | | | |
|---|---|---|---|
| 5,907,147 A | 5/1999 | La | |
| 5,969,321 A | 10/1999 | Danielson et al. | |
| 6,431,711 B1 * | 8/2002 | Pinhanez | H04N 9/3194 353/69 |
| 6,561,428 B2 | 5/2003 | Gerst et al. | |
| 6,684,176 B2 | 1/2004 | Willins et al. | |
| 8,490,877 B2 | 7/2013 | Kearney | |
| 8,520,836 B2 | 8/2013 | Johnston | |
| 9,092,684 B1 * | 7/2015 | Sundaram | G06K 7/10722 |
| 9,140,554 B2 | 9/2015 | Jerauld | |
| 9,349,047 B2 | 5/2016 | Fiorini et al. | |
| 9,354,066 B1 | 5/2016 | Gupta et al. | |
| 10,474,857 B2 | 11/2019 | Todescato et al. | |
| 2007/0032225 A1 * | 2/2007 | Konicek | F24F 11/62 455/417 |
| 2010/0199232 A1 * | 8/2010 | Mistry | G06F 3/0426 715/863 |
| 2011/0007035 A1 * | 1/2011 | Shai | G06F 3/0338 345/179 |
| 2011/0090093 A1 | 4/2011 | Grimm et al. | |
| 2011/0205497 A1 * | 8/2011 | Wakabayashi | H04N 9/3194 353/28 |
| 2013/0169536 A1 | 7/2013 | Wexler et al. | |
| 2013/0278631 A1 | 10/2013 | Border et al. | |
| 2014/0350853 A1 * | 11/2014 | Proux | G08G 1/096741 701/533 |
| 2015/0070388 A1 * | 3/2015 | Sheaffer | G06T 11/00 345/633 |
| 2015/0074616 A1 | 3/2015 | Hokyung et al. | |
| 2015/0186039 A1 * | 7/2015 | Ide | H04N 9/3194 345/168 |
| 2015/0193982 A1 * | 7/2015 | Mihelich | H04L 67/18 345/633 |
| 2015/0198454 A1 | 7/2015 | Moore et al. | |
| 2015/0199566 A1 | 7/2015 | Moore et al. | |
| 2015/0211858 A1 * | 7/2015 | Jerauld | G01C 21/20 701/541 |
| 2015/0278570 A1 | 10/2015 | Van Horn et al. | |
| 2015/0309578 A1 * | 10/2015 | McCoy | G06V 20/20 715/863 |
| 2016/0025499 A1 | 1/2016 | Moore et al. | |
| 2016/0026253 A1 * | 1/2016 | Bradski | H04N 13/344 345/8 |
| 2016/0259958 A1 | 9/2016 | Nara et al. | |
| 2017/0008521 A1 * | 1/2017 | Braunstein | G01C 21/32 |
| 2017/0103440 A1 | 4/2017 | Xing et al. | |
| 2017/0157783 A1 * | 6/2017 | Ogawa | F16P 3/003 |
| 2017/0180934 A1 * | 6/2017 | Brice | G08B 21/0294 |
| 2017/0256097 A1 * | 9/2017 | Finn | G06F 30/13 |
| 2018/0024630 A1 * | 1/2018 | Goossens | G06F 3/011 345/156 |
| 2019/0080517 A1 * | 3/2019 | You | G06T 19/006 |
| 2022/0244066 A1 * | 8/2022 | Kunii | G03B 29/00 |

FOREIGN PATENT DOCUMENTS

| | | |
|---|---|---|
| KR | 20150062182 A | 6/2015 |
| WO | 2008057135 A2 | 5/2008 |
| WO | 2013049248 A2 | 4/2013 |

OTHER PUBLICATIONS

International Search Report and Written Opinion of the International Searching Authority, issued in corresponding International Application No. PCT/US2018/066326, filed Dec. 18, 2018, 9 pages.
International Preliminary Report on Patentability with Written Opinion dated Jun. 23, 2020, for International Application No. PCT/US2018/066327, filed Dec. 18, 2018, 20 pages.
Extended European Search Report, dated Aug. 16, 2021, for European Application No. 18892457.5, 8 pages.

* cited by examiner

USER-WEARABLE SYSTEMS AND METHODS TO COLLECT DATA AND PROVIDE INFORMATION

TECHNICAL FIELD

The present disclosure relates to a user-wearable system, including a head-worn component, that collects data regarding an environment surrounding a user and uses such collected data to provide information to the user.

BACKGROUND

Description of the Related Art

Warehouses and other similar types of facilities may be used to store large numbers of a wide variety of objects that may be retrieved by workers within the facility, such as may occur, for example, when filling mail orders for delivery. Such facilities may be vast in size and in some instances may be spread across a number of floors, rooms, or buildings. Moreover, in some cases, objects may be placed in locations within the facility that are vacant, which may result in the same type of object being placed in different location within the facility at different times. In such situations, workers may be delayed in retrieving objects stored in the facility. In addition, many such facilities may be staffed by seasonal employees who may work at the facility for short periods of time based on seasonal fluctuations for objects stored in the facility. Retail locations and package sorting facilities can also suffer from similar problems.

BRIEF SUMMARY

Various types of components and systems may be used to improve the efficiency of workers in locating and retrieving objects from warehouse and other types of facilities. In some instances, such systems may include one or more types of wearable components that may be used to obtain information about a user and the surrounding environment, and use that information to assist the user in locating and retrieving objects. The wearable components may be include, for example, components that may be mounted or otherwise worn on the head of the user, such as helmets and/or glasses, as well as components (e.g., gloves, boats, or a watch) that the user may wear on other parts of the body or that the user may attach to other clothing. Such wearable components may include one or more subsystems, such as image sensors, microphones, machine-readable symbol readers, range-finders, and/or pose determination subsystems (containing accelerometers and/or gyroscopes) that may be used to collect information from and about the surroundings of the user. The wearable components may also include one or more of a set of speakers and/or a display subsystem to provide information to the user.

The system may be modular. For example, each of the subsystems may be located along or be incorporated into one or more of the wearable components. In addition, one or more of the wearable components may be worn by a user. Accordingly, some users may wear only the head-worn component, whereas another user may wear the head-worn component, a wrist mounted display (e.g., a watch), and a set of safety gloves.

A system that provides information to a user, the system which is mounted on one or more articles worn by the user, may be summarized as including a communications subsystem, the communications subsystem which includes at least one antenna and at least one radio: a user interface subsystem that includes at least one audio transducer that provides audio cues to the user and that receives input from the user at least one image sensor, the at least one image sensor which captures images of at least a portion of an environment in which at least a portion of the system operates and which provides electronic representations of the captured images; a pose determination subsystem that includes at least one of an accelerometer or a gyroscope, that at least one accelerometer and gyroscope which generate one or more signals indicative of at least one of a position or an orientation of the user; and a control system that communicatively couples to each of the communications subsystem, the user interface subsystem, the at least one image sensor, and the pose determination subsystem, the control system which: receives one or more signals via at least one of the communications subsystem, the at least one image sensor, and the pose determination subsystem; and controls the user interface subsystem to provide the audio cues to the user, the audio cues which provide at least one of information regarding navigation through the environment in which at least a portion of the system operates and information regarding at least one object to be retrieved from the environment in which at least a portion of the system operates. The user interface subsystem may include a display subsystem, the display subsystem which may include at least one light source, the light source which may be oriented to selectively render a display from the light source within a field of vision of the user, wherein the control system may control the display subsystem to render a changeable display within the environment in which at least a portion of the system operates, the rendered display which is based at least in part on the received one or more signals. The at least one light source may project the display to impact objects within the environment in which at least a portion of the system operates.

The system may further include an augmented reality display that is positionable proximate one or both eyes of the user, wherein the at least one light source projects the display onto the augmented reality display. The display may be comprised of a plurality of shapes and each shape may be at least one of multiple colors. The at least one of shape and color of the display may be based at least in part upon the one or more signals received via the communications subsystem. The information regarding navigation may include location information regarding a location of the at least one object to be retrieved and route information regarding a route to the location of the at least one object. The at least one object to be retrieved may include a plurality of objects to be retrieved, at least some of the plurality of objects to be retrieved may be in different locations, wherein the route information includes a route to each respective location for the plurality of objects to be retrieved. The at least one audio transducer in the user interface subsystem may include at least two speakers. The at least one audio transducer in the user interface subsystem may include at least one microphone. One of the at least one audio transducer in the user interface may include at least one speaker and at least one microphone. The at least one audio transducer in the user interface subsystem may include at least one bone conduction speaker. At least some of the one or more signals received by the control system may be received from at least one remote processor via the communications subsystem. The at least one image sensor and the pose determination subsystem may be communicatively coupled with the at least one remote processor via the communications subsystem, and signals from at least one of the image sensor and the pose determination subsystem may be transmitted to the at least one remote processor. Information regarding the at least one object to be retrieved may include information for handling the at least one object.

The at least one image sensor may include two image sensors that are separated by a distance, in which each of the two image sensors captures a series of two-dimensional image of the environment in which at least a portion of the system operates, and the control system may further combine corresponding ones of the respective two-dimensional images captured by the two image sensors into a series of three-dimensional images of at least a portion of the environment in which at least a portion of the system operates. The control system may determine dimensions of objects within the environment in which at least a portion of the system operates based at least in part on one or more of the three-dimensional images, and the control system may identify the object to be retrieved based at least in part on the determined dimensions. The information regarding navigation may include safety information regarding the environment in which at least a portion of the system operates. The navigation information may be based at least in part up on a current location of the system. The current location of the system may be based at least in part on one or more wireless signals emitted from the at least one antenna in the communications subsystem.

The system may further include an RFID transponder, the RFID transponder which emits a signal when energized by an RFID interrogator. A current location of the system may be determined based at least in part on the RFID transponder when the RFID transponder is energized by at least one RFID interrogator located in the environment in which the system is located.

The system may further include a machine-readable symbol reader, the machine-readable symbol reader which has a field-of-view that includes at least a portion of the environment in which at least a portion of the system operates, the machine-readable symbol reader which captures an electronic representation of one or more machine-readable symbols that are within the field-of-view of the machine-readable symbol reader.

The control unit may further decode the electronic representation of the one or more machine-readable symbols, at least one of the one or more machine-readable symbols which is borne by an object located in the environment in which at least a portion of the system operates, and the information regarding the at least one object to be retrieved may be based at least in part on the decoded electronic representation. The user interface subsystem may include an electronic display, the electronic display which is mounted on a wearable object and includes a changeable screen, wherein the control system transmits one or more signals that cause the changeable screen to render an image, the rendered image providing at least one of information regarding navigation through the environment in which at least a portion of the system operates and information regarding at least one object to be retrieved from the environment in which at least a portion of the system operates. The user interface subsystem may include a voice-control subsystem, the voice-control subsystem receiving the input from the at least one transducer, the input including at least one voice command from the user, and converting the at least one voice command to text commands, wherein at least one of the information regarding navigation and the information regarding objects to be retrieved is based at least in part on the converted text commands.

The system may further include at least one finger-worn indicia that is wearable on a finger of the user, wherein images of the at least one finger-worn indicia are captured by the at least one image sensor, wherein the control system detects an occurrence of a first gesture represented by a trace of a number of movements of the at least one finger-worn indicia in the captured images, and in response, to detection of the occurrence of the first gesture, executes at least one defined function. The at least one defined function may include at least one of: capturing an image of a region of interest by the at least one image sensor, the region of interest which is a subset of the field-of-view of the at least one image sensor; comparing a list of objects to be retrieved with one or more physical objects that have been retrieved by the user; and providing one or more commands for a remotely controlled vehicle.

The system may further include a time-of-flight sensor, the time-of-flight sensor which generates a distance signal indicative of a distance from the time-of-flight sensor to a remote object, wherein the information regarding navigation from the control subsystem is based at least in part on the distance signal generated by the time-of-flight sensor.

The system may further include a facial gesture recognition subsystem, the facial gesture recognition subsystem which includes at least one facial gesture image sensor oriented to obtain an electronic image of a human face, wherein the control system further determines a facial gesture based on the obtained electronic image of the human face and performs at least one defined function based at least in part on the determined facial gesture. The at least one defined function may include at least one of: capturing an image of a region of interest by the at least one image sensor, the region of interest which is within a field-of-view of the at least one image sensor; comparing a list of objects to be retrieved with one or more physical objects that have been retrieved by the user; and providing one or more commands for a remotely controlled vehicle.

The system may further include an eye tracking subsystem that includes at least eye tracking image sensor oriented to obtain images that include at least one eye of the user, wherein the control system determines a direction of orientation of the at least one eye wherein the control system controls the user interface subsystem to provide audible cues based at least in part on the determined direction of orientation of the at least one eye.

A distributed system may be summarized as including the wearable system and a remote processor, the remote processor which is communicatively coupled with the communications subsystem, the remote processor which receives signal from at least one of the image sensor and the pose determination subsystem, the remote processor which transmits one or more signals to the control system via the communications subsystem, wherein at least one of the information regarding navigation and the information regarding at least one object to be retrieved is based at least in part on the one or more signals transmitted from the remote processor.

The distributed system may further include at least one wearable safety item, the at least one wearable safety item which includes a transponder that emits a signal when energized, the signal which is transmitted to at least one of the control subsystem and the remote processor, wherein the at least one of the control subsystem and the remote processor takes at least one safety action based at least in part on an absence of the signal from the transponder. The at least one safety action may include at least one of: preventing access to the user to at least a portion of the environment in which at least a portion of the system operates; and generating an audio cue via the user interface subsystem. The remote processor may receive signals from one or more objects proximate the wearable system, wherein the remote processor transmits one or more signals to the control system in the wearable system based upon the one or more objects proximate the wearable system. The one or more objects proximate the wearable system may include at least one moveable object, wherein the remote processor transmits one or more signals to the at least one movable object, and wherein the transmitted one or more signals results in the at least one moveable objects changing at least one of a velocity and a direction of travel. The remote processor may transmit at least one warning signal to the control system in the wearable system based at least in part on the signals received by the remote processor from the other movable objects proximate the wearable system.

The distributed system may further include at least one semi-autonomous vehicle, the at least one semi-autonomous vehicle which is communicatively coupled to the control system in the wearable system, the at least one semi-autonomous vehicle which receives at least one command from the control system, the at least one command which includes at least one commands involving at least one of a speed and a direction of travel of the semi-autonomous vehicle.

A navigation system may be summarized as including the wearable system and a set of navigation beacons, each navigation beach which is operable to transmit location information regarding a current location of the system.

A navigation system may be summarized as including the wearable system and a set of navigation beacons, each navigation beacon which is operable to transmit one or more signals, each signal which is related to a transmission received from the wearable system; and a second control unit that determines location information regarding the system based at least in part on the signals received from one or more of the navigation beacons.

A method of operation of a system that provides information to a user, the system which is mounted on one or more articles worn by the user, may be summarized as including receiving from a user-wearable user interface subsystem one or more verbal inputs from the user; receiving from a pose determination subsystem one or more signals indicative of at least one of a position or an orientation of the user; receiving one or more electronic representations of images that have been captured by the image sensor, the images being of an environment in which at least a portion of the system operates; determining one or more audio cues for the user based at least in part upon one or more of the one or more verbal inputs received from the user-wearable user interface subsystem, the one or more signals received from the pose determination subsystem, and the one or more electronic representations of captured images; and transmitting the one or more audio cues to the user-wearable user interface subsystem, the audio cues which provide at least one of information regarding navigation through the environment in which at least a portion of the system operates and information regarding at least one object to be retrieved from the environment in which at least a portion of the system operates.

The method may further include determining one or more displays to be rendered for the user based at least in part upon one or more of the one or more verbal inputs received from the user-wearable user interface subsystem, the one or more signals received from the pose determination subsystem, and the one or more electronic representations of captured images; and transmitting one or more signals to a display subsystem, the one or more signals which control the display subsystem to render a changeable display within the environment in which at least a portion of the system operates. Transmitting one or more signals to the display subsystem may include transmitting one or more signals to control the display subsystem to project the changeable display within the environment in which at least a portion of the system operates.

The method may further include rendering with an augmented reality display the changeable display on one or more lenses that are proximate one or both eyes of the user.

Transmitting one or more signals may further include transmitting one or more signals to the display subsystem to render a changeable display wherein the changeable display is comprised of a plurality of shapes, each shape which may be at least one of multiple colors.

Transmitting one or more signals may further include transmitting one or more signals to the display subsystem to render a changeable display wherein the at least one of shape and color of the display is based at least in part upon one or more of the one or more verbal inputs received from the user-wearable user interface subsystem, the one or more signals received from the pose determination subsystem, and the one or more electronic representations of captured images.

The method may further include determining location information regarding a location of the at least one object to be retrieved; and determining route information regarding a route to the location of the at least one object. The at least one object to be retrieved may include a plurality of objects to be retrieved, at least some of the plurality of objects to be retrieved which are in different locations, and determining route information may include determining a route to each respective location for the plurality of objects to be retrieved.

Transmitting the one or more audio cues to the user-wearable user interface subsystem may further include transmitting one or more audio cues to the user-wearable interface subsystem wherein the one or more audio cues cause the one or more audio cues to be provided using at least two speakers.

Receiving one or more verbal inputs may further include receiving one or more verbal inputs from at least one microphone.

Receiving one or more verbal inputs may further include receiving one or more verbal inputs from a transducer and transmitting the one or more audio cues comprises transmitting the one or more audio cues to be provided using the transducer. Transmitting the one or more audio cues may include transmitting the one or more audio cues to be provided using the at least one bone conduction speaker. Determining the one or more audio cues for the user may be performed at least in part by at least one remote processor.

The method may further include transmitting signals from at least one of the image sensor and the pose determination subsystem to the at least one remote processor.

Transmitting the one or more audio cues to the user regarding at least one object to be retrieved may further include transmitting the one or more audio cues to the user regarding information for handling the at least one object.

The method wherein the at least one image sensor includes two image sensors that are separated by a distance may further include capturing by each of the two image sensors a series of two-dimensional image of the environment in which at least a portion of the system operates; and combining corresponding ones of the respective two-dimensional images captured by the two image sensors into a series of three-dimensional images of at least a portion of the environment in which at least a portion of the system operates.

The method may further include determining dimensions of objects within the environment in which at least a portion of the system operates based at least in part on one or more of the three-dimensional images; and identifying the object to be retrieved based at least in part on the determined dimensions.

Transmitting the one or more audio cues to the user regarding information regarding navigation may further include transmitting the one or more audio cues to the user regarding safety information related to the environment in which at least a portion of the system operates.

The method may further include determining information regarding navigation based at least in part up on a current location of the system.

Determining information regarding navigation may be based upon the current location of the system, wherein the current location of the system is based at least in part on one or more wireless signals emitted from at least one antenna in a communications subsystem.

The method may further include emitting a signal from an RFID transponder when the RFID transponder is energized by an REID interrogator.

The method may further include determining a current location of the system when the RFID transponder is energized by at least one RFID interrogator located in the environment in which the system is located.

The method may further include capturing by the machine-readable symbol reader an electronic representation of one or more machine-readable symbols that are within the field-of-view of the machine-readable symbol reader.

The method may further include decoding the electronic representation of the one or more machine-readable symbols, at least one of the one or more machine-readable symbols which is borne by an object located in the environment in which at least a portion of the system operates, and wherein the information regarding the at least one object to be retrieved is based at least in part on the decoded electronic representation.

The method may further include transmitting one or more signals to an electronic display that includes a changeable screen, the one or more signals that cause the changeable screen to render an image to provide at least one of information regarding navigation through the environment in which at least a portion of the system operates and information regarding at least one object to be retrieved from the environment in which at least a portion of the system operates.

The method may further include receiving by a voice-control subsystem the input from the at least one transducer, the input which includes at least one voice command from the user; and converting the at least one voice command to text, and wherein at least one of the information regarding navigation and the information regarding objects to be retrieved is based at least in part on the text.

The method may further include capturing by the at least one image sensor images of at least one finger-worn indicia that is wearable on a finger of the user; detecting an occurrence of a first gesture represented by a trace of a number of movements of the at least one finger-worn indicia in the captured images; and in response, to detecting the occurrence of the first gesture, executing at least one defined function.

Executing at least one defined function may further include executing instructions for at least one of: capturing an image of a region of interest by the at least one image sensor, the region of interest which is a subset of the field-of-view of the at least one image sensor; comparing a list of objects to be retrieved with one or more physical objects that have been retrieved by the user; and providing one or more commands for a remotely controlled vehicle.

The method may further include generating by a time-of-flight sensor a distance signal indicative of a distance from the time-of-flight sensor to a remote object, wherein the information regarding navigation from the control subsystem is based at least in part on the distance signal generated by the time-of-flight sensor.

The method may further include obtaining by at least one facial gesture image sensor an electronic image of a human face; determining by a facial gesture recognition subsystem a facial gesture based on the obtained electronic image of the human face; and performing at least one defined function based at least in part on the determined facial gesture.

Performing at least one defined function may further include performing at least one of: capturing an image of a region of interest by the at least one image sensor, the region of interest which is within a field-of-view of the at least one image sensor; comparing a list of objects to be retrieved with one or more physical objects that have been retrieved by the user; and providing one or more commands for a remotely controlled vehicle.

The method may further include obtaining images from an eye tracking subsystem, the obtained images including at least one eye of the user; determining a direction of orientation of the at least one eye; and providing audible cues based at least in part on the determined direction of orientation of the at least one eye.

The method may further include receiving a signal from a transponder attached to at least one wearable safety item; and transmitting one or more signals that cause at least one safety action, the transmitting of the one or more signals which is based at least in part on an absence of the signal from the transponder attached to the at least one wearable safety item. Transmitting one or more signals that result in at least one safety action being performed may include performing at least one of: preventing access to the user to at least a portion of the environment in which at least a portion of the system operates; and generating an audio cue via the user interface subsystem.

The method may further include receiving signals from one or more objects proximate the system; and transmits one or more signals to the system based upon the one or more objects proximate the system.

Receiving signals from one or more objects may include receiving signals from at least one moveable object and may further include transmitting one or more signals to the at least one movable object that causes the at least one moveable objects to change at least one of a velocity and a direction of travel.

The method may further include transmitting at least one warning signal to the system based at least in part on the signals received by the remote processor from the other movable objects proximate the system.

The method may further include receiving signals from a set of navigation beacons, each signal which is related to a transmission by the system; determining a location of the system based at least in part on the received signals.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with scan engines, imagers, decoding circuitry, and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
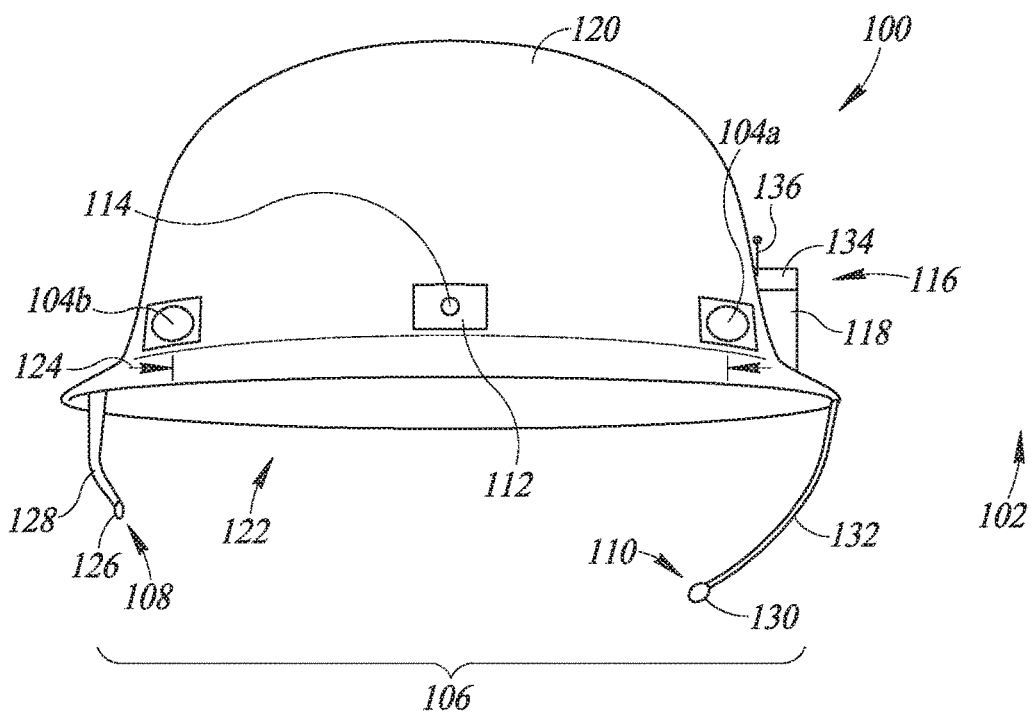
FIG. 1 is a front, center isometric view of a type of wearable head-worn component, such as a helmet, that may be worn by a user, and that may capture information regarding the environment in which the wearable head-worn component operates and that may provide information to the user, according to at least one illustrated implementation.

FIG. 1 shows a first type of wearable head-worn component 100, such as a helmet, that may be worn by a user, and that may capture information regarding an environment 102 in which the wearable head-worn component 100 operates and that may provide information to the user, according to at least one illustrated implementation. The wearable head-worn component 100 may include a right image sensor 104a and a left image sensor 104b (collectively, image sensors 104), a user interface subsystem 106 that includes a first audio transducer 108 that provides audio cues to the user, a second audio transducer 110 that receives audible input from the user, and a display subsystem 112 that includes a light source 114 that may be used to emit light onto objects within the environment 102 surrounding the wearable head-worn component 100, a communications subsystem 116, and a control system 118.

The wearable head-worn component 100 includes an outer shell 120 that forms a concave shape with a cavity 122. The cavity 122 may be sized and shaped to at least partially surround an adult-sized human head. In some implementations, the cavity 122 may include one or more adjustable components, such as an adjustable head strap that may be adjusted to fit snugly around a portion of the head of a user. In some implementations, the cavity 122 may include one or more cushioning components, such as open- or closed-cell foam, rubber, or some other compressible substance, and/or netting, that may be used to cushion the head of the user while the wearable head-worn component 100 is placed on top of the head of the user. In some implementations, the wearable head-worn component 100 may include one or more chin straps that may be used to secure the wearable head-worn component 100 to the head of the user.

The image sensors 104 may each capture one or more electronic representations of images in which each image is comprised of a portion of the surrounding environment 102 within the respective field of view of each of the image sensors 104. Such electronic representations may be made, for example, by a set of transducers that convert light waves into electrical signals. In some implementations, for example, the image sensors 104 may capture up to 30 images per second, in which each image is comprised of at least 1 Megapixel. In some implementations, the image sensors 104 may capture images have a lower resolution, such as images that are captured having QQVGA (Quarter Quarter Video Graphics Array) resolution of about 19,200 pixels. The image sensors 104 may be oriented along the wearable head-worn component 100 such that each field of view for each image sensor 104 is directed towards a portion of the surrounding environment 102 that a user faces when the user wears the wearable head-worn component 100. In some implementations, the respective field of view of each image sensor 104 may be movable to selectively encompass various portions of the environment 102 surrounding the user, such as may occur, for example, when a head of the user moves when the wearable head-worn component 100 is mounted on the head of the user.

The two image sensors 104 may be separated by a distance 124 across a portion of the wearable head-worn component 100. In such an implementation, each of the image sensors 104 may capture a two-dimensional image of a portion of the environment 102 surrounding the system 100. Because the two image sensors 104 are separated by the distance 124, the two corresponding two-dimensional images (one image from each of the image sensors 104) may be combined to provide a three-dimensional representation of a portion of the surrounding environment 102. As discussed below, such a three-dimensional representation may be used for other functions and applications, such as, for example, to navigate the surrounding environment 102, and/or to confirm the size and shape of an object to be retrieved.

The user interface subsystem 106 may include a first audio transducer 108 that can be used to provide audio cues to the user and a second audio transducer 110 to receive audible or verbal input from the user. In some implementations, a single audio transducer may be used to both provide audio cues to and receive verbal input from the user. In some implementations, one or both of the first audio transducer 108 and/or the second audio transducer 110 may be communicatively coupled with the control system 118. In such an implementation, the first audio transducer 108 may receive the audio cues from the control system 118, and the second audio transducer 110 may transmit the received verbal input to the control system 118.

The first audio transducer 108 may include one or more speakers 126 that may be located at the end of a first arm 128 that descends from one side of the shell 120. The first arm 128 may be placed on the side of the shell 120 such that the speakers 126 are proximate the corresponding ear of the user when the user wears the wearable head-worn component 100. One or more electrically conducting wires may traverse a length of the first arm 128 to propagate the electrical signals that carry the audible cues. Such electrical signals may be received from the control system 118 and/or from a remote processor. In some implementations, the first arm 128 may be adjustable such that the speakers 126 may be placed over the auditory canal of the user such that vibrations from the speakers 126 travel through the air in the auditory canal to impact the ear drum. In some implementations, the speakers 126 may be bone conduction speakers. In such an implementation, the first arm 128 may place the speakers 126 alongside the face of the user proximate the jaw bone such that vibrations from the speakers 126 are conducted through the bone to the ear drum. Such a bone conduction implementation advantageously enables the user to keep the auditory canal uncovered such that sounds from the surrounding environment 102 may still be perceived. Such an implementation may be particularly useful in warehouse type settings in which the user may maintain awareness of the surrounding environment 102 for safety.

The second audio transducer 110 may include a microphone 130 that may be located at the end of a second arm 132 that may descend from one side of the shell 120. In some implementations, the first arm 128 and the second arm 132 may be located on opposite sides of the shell 120. In some implementations, the first arm 128 and the second arm 132 may be located on the same side of the shell 120. In some implementations, a single arm (not shown) may descend from one side of the shell 120 and include the first audio transducer 108 positioned at a first location along the single arm and the second audio transducer 110 positioned at a second location along the single arm different from the first location. The microphone 130 may be used to receive audible commands emitted from the user, and to transform such audible commands to electrical signals that are transmitted to the control system 118. One or more electrically conducting wires may traverse a length of the second arm 132 to propagate the electrical signals that carry the audible commands received from the user.

The user interface subsystem 106 may include the display subsystem 112, which in some implementations, includes one or more light sources 114 that may be used to project displays within the environment 102 surrounding the wearable head-worn component 100. The display subsystem 112 may be mounted along a front side of the wearable head-worn component 100 such that the light sources 114 face in a forward direction when a user wears the wearable head-worn component 100. In some implementations, the light sources 114 may include light emitting diodes (LEDs) or lasers that may emit light in a relatively forward direction with respect to the user. In such an implementation, the display emitted by the light sources 114 may be shapes that provide navigation directions (e.g., arrows) or that indicate objects within the surrounding environment 102 to be retrieved (e.g., green dot(s)). In some implementations, the display emitted by the light sources 114 may include different colors to provide information to the user. In some implementations, the light sources 114 in the display subsystem 112 may emit a red "X" onto a portion of the surrounding environment 102 to indicate a dangerous area that the user should not approach. In another implementation, the light sources 114 in the display subsystem 112 may emit a green dot onto an object within the surrounding environment 102 to indicate an object that should be retrieved. In some implementations, the light sources 114 in the display subsystem 112 may project instructions or information (e.g., "HEAVY" or "FRAGILE") onto the object to be retrieved.

In some implementations, the display subsystem 112 may include one or more modifiable directional components, such as movable or modifiable reflective elements (e.g., mirrors), that may be used to modify the relative direction at which the light is emitted from the light sources 114. As such, the modifiable direction components may be used to maintain the display in the appropriate location even as the wearable head-worn component 100 moves with the head of the user. The display subsystem 112 may be communicatively coupled to the control system 118 and may receive commands to project a display in a specified direction from the light sources 114.

The wireless communications subsystem 116 may include a radio 134 and an antenna 136. The antenna 136 may be any type of component or set of components that have a resonant frequency. In some implementations, the antenna 136 may comprise an inductor and one or more sets of circuitry to form a resonant circuit having a resonant frequency. Such sets of circuitry may include one or more resistors and/or capacitors that may be selectively, electrically coupled across the antenna 136 to change the resonant frequency. The radio 134 may transmit and receive electrical signals via the antenna 136. Such transmission and reception may occur through one or more wireless networks to which the radio 134 and antenna 136 may be communicatively coupled. Such a wireless network may transmit messages using one or more wireless communication protocols, such as, for example, Bluetooth, Bluetooth Low Energy, ZigBee, or any other acceptable wireless communication protocol.

The control system 118 may take the form of any current or future developed processor-enabled device capable of executing one or more instruction sets. The control system 118 may be communicatively coupled with one or more of the image sensors 104, the user interface subsystem 106, the display subsystem 112, and/or the communications subsystem 116, and may receive and/or transmit one or more electrical signals to respective subsystem and/or component. The control system 118 may include one or more processing units to execute one or more processor-readable instructions, instruction sets, or instruction blocks. The control system 118 may include a system memory to store one or more processor-readable instructions, instruction sets, or instruction blocks to be executed by the processor. Such processor-readable instructions, instruction sets, or instruction blocks may be used to capture one or more images using the image sensors 104, transmit and/or receive one or more signals using the user interface subsystem 106, and/or emit light from the display subsystem 112 to provide a visible display for the user. In some implementations, the processor-readable instructions, instruction sets, or instruction blocks may control the operation of various subsystems or components on the wearable head-worn component 100. In some implementation, the control system 118 may be an off-board processor-enabled device that is communicatively coupled with the wearable head-worn component 100 via a communications link using one or more wireless and/or wired communications protocols, such as, for example, Wi-Fi, Ethernet, Bluetooth, ZigBee or any other acceptable communication protocol. In some implementations, the control system 118 may be incorporated into the wearable head-worn component 100.

Figure 2:
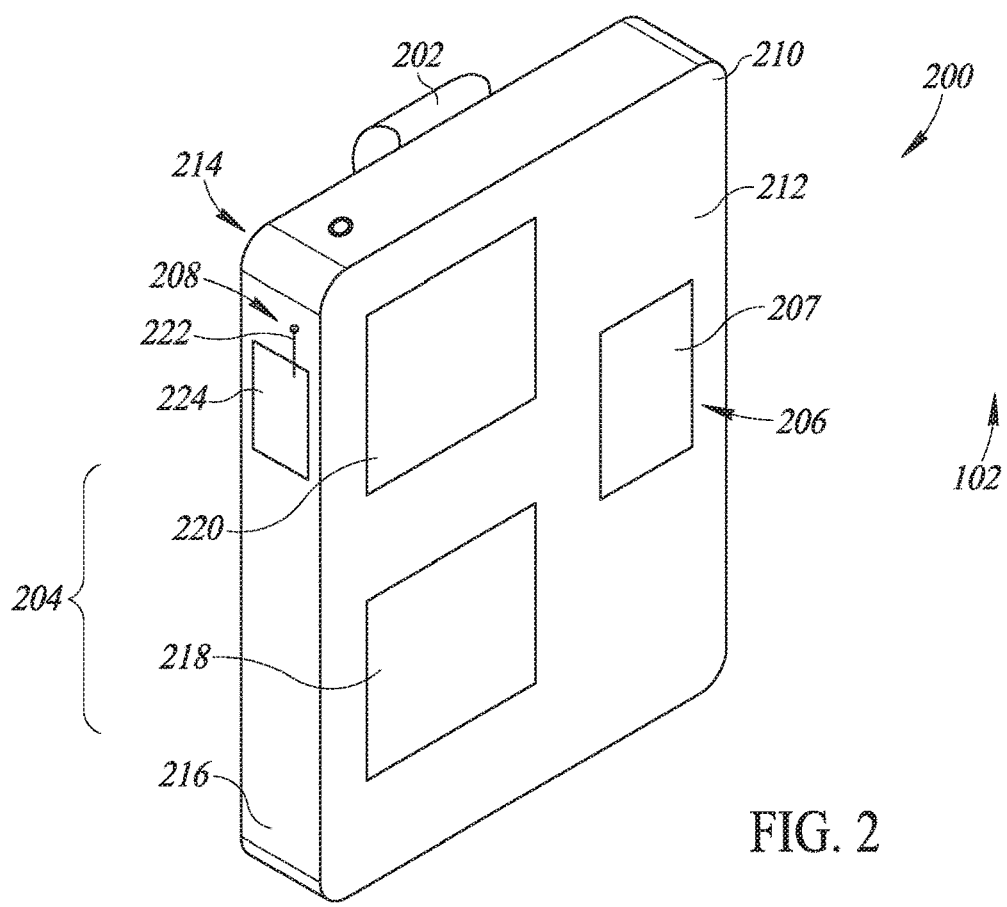
FIG. 2 is a top, left isometric view of wearable clip-mounted component that may be worn by a user via a clip, in which the wearable clip-mounted component may include a pose determination subsystem and a transmitter that transmits a signal that may encode information, according to at least one illustrated implementation.

FIG. 2 shows a wearable clip-mounted component 200 that may be worn by a user via a clip 202, in which the wearable clip-mounted component 200 may include a pose determination subsystem 204, an identification module 206 that may transmit encoded information using a machine-readable symbol, and a communications subsystem 208, according to at least one illustrated implementation. The wearable clip-mounted component 200 may include a casing 210 that has a front face 212, an opposing back face 214, and one or more side walls 216 that extend there between. The casing 210 may include an interior cavity between the front face 212 and the opposing back face 214 that holds one or more of the pose determination subsystem 204, the identification module 206, and the communications subsystem 208.

The clip 202 may be a formed piece of metal, plastic, or other durable, flexible material that may have a length that extends from an open end and an opposing closed end. The closed end may extend outward from one edge of the back face 214 of the casing 210 and turn to extend across the back face 214 to the opposing edge of the back face 214 whereupon the clip 202 terminates with the open end. The open end of the clip 202 may be biased against the back face 214 of the casing 210, such that the open end of the clip 202 may be moved away from the back face 214 to form an opening. Such an opening may be used to slide an object, such as a piece of fabric (such as, for example, from a shirt or a pair of pants), between the back face 214 of the casing 210 and the clip 202 to thereby secure the wearable clip-mounted component 200 to the piece of fabric.

The pose determination subsystem 204 may include one or both of an accelerometer (e.g., three-axis accelerometer) 218 and a gyroscope 220. The pose determination subsystem 204 may produce one or more signals indicative of at least a position or an orientation of a user wearing or otherwise physically securing the wearable clip-mounted component 200. Such one or more signals may be transmitted to the control system 118 via the communications subsystem 208. The accelerometer 218 may generate one or more signals indicative of a relative movement of the accelerometer 218, and by extension the wearable clip-mounted component 200, within the environment 102 surrounding the wearable clip-mounted components 200, in such an implementation, the signals generated by the accelerometer 218 may provide the movement of the accelerometer within three-dimensional space relative to a starting position. Such information may be used to determine the direction(s) and rate(s) at which the accelerometer 218 is moving. The gyroscope 220 may generate and transmit one or more signals indicative of an angular velocity of the gyroscope 220 within the three-dimensional space of the environment 102 that surrounds the wearable clip-mounted component 200.

A control system (e.g., the control system 118) may use the signals generated from either or both of the accelerometer 218 and the gyroscope 220 to determine if the pose determination subsystem 204 is experiencing movement indicative of a fall or other uncontrolled motion by the user. In such a situation, the control system 118 may transmit a warning or distress signal that may result in protective action being taken by other components within the environment 102 surrounding the user. For example, in some implementations, once the control system (or other processor enabled device) determines that the signals received from the pose determination subsystem 204 indicate a fall by the user, the control system (or other processor enabled device) may send one or more signals that cause one or more objects and systems within the surrounding environment 102 to take preventative action, such as, for example, by shutting down. The signals from the pose determination subsystem 204 may be used in some implementations to determine an orientation of the user (e.g., to determine the direction which the user is facing). Such orientation information may be used to generate instructions and/or displays to be provided to the user. In some implementations, the signals generated by the pose determination subsystem 204 may be processed along with signals from other systems (e.g., the image sensors 104) to determine a position and/or orientation of the user.

The identification module 206 may transmit encoded information as part of a machine-readable symbol. In some implementations, the identification module 206 may be a radio frequency identification ("MD") transponder 207 that may be excited and energized when receiving an electromagnetic wave at a resonance frequency. In response, the energized UM transponder 207 in the identification module 206 may transmit an electromagnetic wave at the same or at a second resonance frequency. The transmitted wave from the identification module 206 may include encoded information, such as an identification string for the identification module 206 and/or for the wearable clip-mounted component 200. In such an implementation, the wireless transmission at the second resonance frequency may be directly from the identification module 206 and/or at the communications subsystem 208.

The communications subsystem 208 may include an antenna 222 and a radio 224. The antenna 222 may be any type of component or set of components that have a resonant frequency. In some implementations, the antenna 222 may comprise an inductor and one or more sets of circuitry to form a resonant circuit having a resonant frequency. Such sets of circuitry may include one or more resistors and/or capacitors that may be selectively, electrically coupled across the antenna 222 to change the resonant frequency. The radio 224 may transmit and receive electrical signals via the antenna 222. Such transmission and reception may occur through one or more wireless networks to which the radio 224 and antenna 222 may be communicatively coupled. In some implementations, the communications subsystem 208 in the wearable clip-mounted component 200 may be communicatively coupled with a corresponding communications subsystem in some other wearable component (e.g., the wireless communications subsystem 116 in the wearable head-worn component 100). Such wireless transmissions between the components may be via a wireless network in which messages may be transmitted using one or more wireless communication protocols, such as, for example, Bluetooth, Bluetooth Low Energy, ZigBee, or any other acceptable wireless communication protocol.

Figure 3:
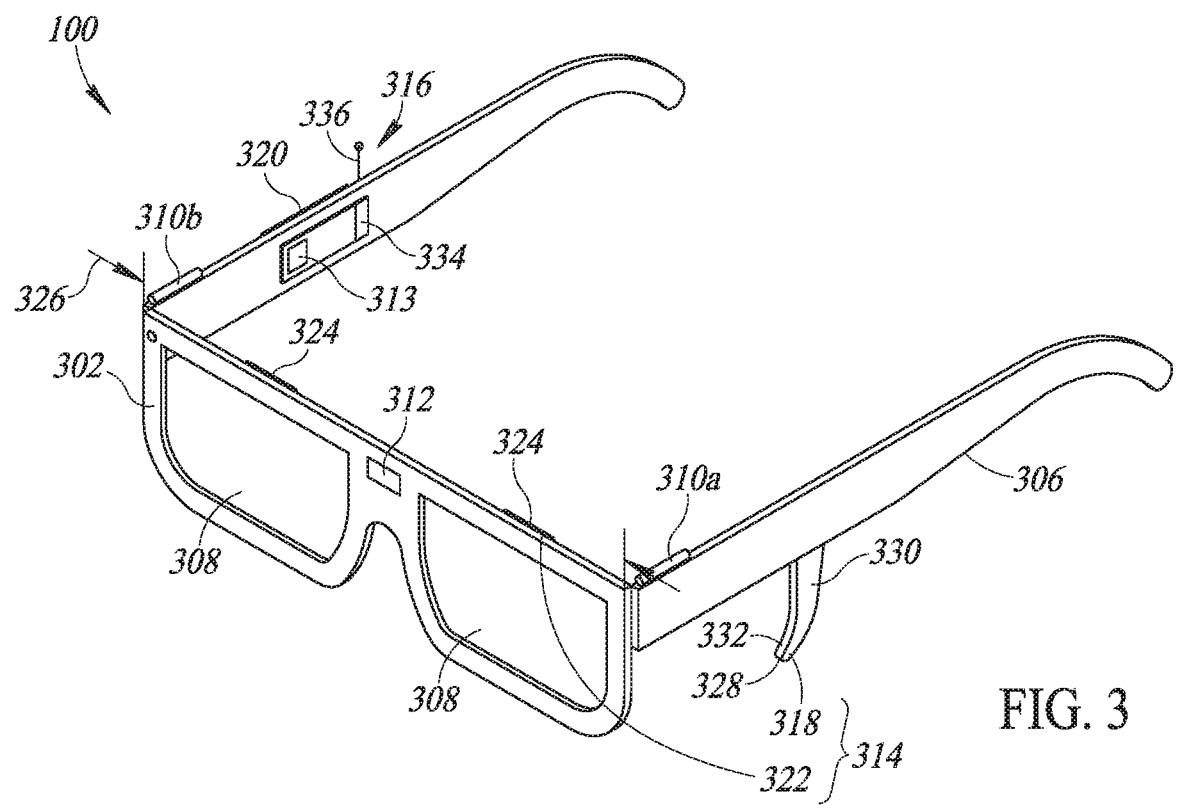
FIG. 3 is a top isometric view of another type of wearable head-worn component, such as a set of glasses, that may be worn by the user, and that may capture information regarding the environment in which the wearable head-worn component operates and that may provide information to the user, according to at least one illustrated implementation.

FIG. 3 shows another type of wearable head-worn component 100 in the form of a set of glasses 302 that may be worn by the user. The set of glasses 302 may capture information regarding an environment 304 in which the set of glasses 302 operates and may provide information to the user, according to at least one illustrated implementation. The set of glasses may include a frame 306 and one or more lenses 308 that are positioned proximate the respective eye or eyes of the user when the glasses 302 are properly mounted on the user's head. The frame 306 may be comprised of one or more of a metal, plastic, or other durable material. The frame 306 may include one or two apertures that are sized and shaped to securely receive a respective lens 308. The lenses 308 may be comprised of a transparent or semi-transparent material through which the user can see. Such material may be scratch resistant or scratch proof, and may be treated with an anti-glare coating that may improve visibility through the lenses 308 by reducing the glare from objects in the surrounding environment 304 perceived by a user wearing the glasses 302. The glasses 302 may include right image sensor 310a and a left image sensor 310b (collectively, image sensors 310), a user interface subsystem 314 that includes an audio transducer 318 that provides audio cues to and receive audible input from the user and a display subsystem 322 that includes light sources 324 that may be used to project displays onto the lenses 308, a machine-readable symbol reader 312, a communications subsystem 316, and a control system 320.

The image sensors 310 may each capture one or more electronic representations of images in which each image is comprised of a portion of the surrounding environment 304 within the respective field of view of each of the image sensors 310. Such electronic representations may be made, for example, by a set of transducers that convert light waves into electrical signals. In some implementations, for example, the image sensors 310 may capture up to 30 images per second, in which each image is comprised of at least 1 Megapixel. In some implementations, the image sensors 310 may capture images have a lower resolution, such as images that are captured having QQVGA (Quarter Quarter Video Graphics Array) resolution of about 19,200 pixels. The image sensors 310 may be oriented along the glasses 302 such that each field of view for each image sensor 310 is directed towards a portion of the surrounding environment 304 that a user faces when the user wears the glasses 302. In some implementations, the respective field of view of each image sensor 310 may be movable to selectively encompass various portions of the environment 304 surrounding the user, such as may occur, for example, when a head of the user moves when the wearable head-worn component 300 is mounted on the head of the user.

The two image sensors 310 may be separated by a distance 326 across a portion of the glasses 302, in such an implementation, each of the image sensors 310 may capture a two-dimensional image of a portion of the environment 304 surrounding the glasses 302. Because the two image sensors 310 are separated by the distance 326, the two corresponding two-dimensional images (one image from each of the image sensors 310) may be combined to provide a three-dimensional representation of a portion of the surrounding environment 304. As discussed below, such a three-dimensional representation may be used for other functions and applications, such as, for example, to navigate the surrounding environment 304, and/or to confirm the size and shape of an object to be retrieved.

The user interface subsystem 314 may include the audio transducer 318 and the display subsystem 322. The audio transducer 318 may include one or more speakers 328 that may be located at the end of an arm 330 that descends from one side of the frame 306 of the glasses 302. The arm 330 may be placed on the side of the glasses 302 such that the speakers 328 are proximate one of the ears of the user when the user wears the glasses 302. One or more electrically conducting wires may traverse a length of the arm 330 to propagate the electrical signals that carry the audible cues. Such electrical signals may be received from the control system 320 and/or from a remote processor. In some implementations, the speakers 328 may be bone conduction speakers. In such an implementation, the arm 330 may place the speakers 328 alongside the face of the user proximate the jaw bone such that vibrations from the speakers 328 are conducted through the bone to the ear drum. Such a bone conduction implementation advantageously enables the user to keep the auditory canal uncovered such that sounds from the surrounding environment 304 may still be perceived. Such an implementation may be particularly useful in warehouse type settings in which the user may maintain awareness of the surrounding environment 304 for safely.

The audio transducer 318 may include a microphone 332 that may be located at the end of the arm 330 proximate the speakers 328. In some implementations, the same audio transducer 318 may be used by both the microphone 332 and the speakers 328. The microphone 332 may be used to receive audible commands emitted from the user, and to transform such audible commands to electrical signals that are transmitted to the control unit 320. One or more electrically conducting wires may traverse a length of the arm 330 to propagate the electrical signals that carry the audible commands received from the user. In some implementations, at least one of the user interface subsystem 314 and/or the control system 320 may include a voice-control subsystem 313. The voice-control subsystem 313 may receive the electrical signals generated by the microphone 332, and may convert the electrical signals to text, which may be used by the control unit 322 in generating the audible cues to be transmitted to the user.

The user interface subsystem 314 may include the display subsystem 322, which in some implementations, includes one or more light sources 324 that may be used to project displays onto one or both of the lenses 308. As such, the glasses 302 may form an augmented reality system in which the display subsystem is used to project displays, including shapes, words, and other information onto the lenses 308 within the field of view of a user wearing the glasses 302. The light sources 324 may be mounted proximate a respective edge of one or both of the lenses 308 and may be oriented to direct the light emitted from the light sources 324 to a combiner, which projects the emitted light onto the lenses 308. In such an implementation, the display emitted by the light sources 324 may be shapes that provide navigation directions (e.g., arrows) or that indicate objects within the surrounding environment 304 to be retrieved (e.g., green dot(s)). In some implementations, the display emitted by the light sources 324 may include different colors to provide information to the user. In some implementations, for example, the light sources 324 in the display subsystem 322 may emit a red "X" onto the lenses 308 to indicate a dangerous area that the user should not approach. In another implementation, the light sources 324 in the display subsystem 322 may emit a green dot onto an object within the surrounding environment 304 to indicate an object that should be retrieved. In some implementations, the light sources 324 in the display subsystem 322 may project instructions or information (e.g., "HEAVY" or "FRAGILE") onto the object to be retrieved.

In some implementations, the display subsystem 322 may include one or more modifiable directional components, such as movable or modifiable reflective elements (e.g., mirrors), that may be used to modify the relative direction at which the light is emitted from the light sources 324 and impacts the respective lens 308. As such, the modifiable direction components may be used to maintain the display in the appropriate location on the lenses 308 to indicate a position in the surrounding environment 304 even as the glasses 302 move with the head of the user. The display subsystem 322 may be communicatively coupled to the control unit 320 and may receive commands to project a display from the light sources 324 in a specified direction.

The glasses 302 may include the machine-readable symbol reader 312 that may be used to detect and capture images of a machine-readable symbol within the surrounding environment 304. In some implementations, the machine-readable symbol reader 312 may be located proximate one or both of the glasses 302, and may be oriented to face in a forward direction when the user wears the glasses 302. In some implementations, the machine-readable symbol reader 312 may have a field-of-view that extends outward from the glasses 302, and may be used to delineate a region in which the machine-readable symbol reader 312 may be capable of detecting a machine-readable symbol. The machine-readable symbols may include one-dimensional machine-readable symbols (e.g., barcode symbols) and/or two-dimensional machine-readable symbols (e.g., Quick Response symbols). In some implementations, the machine-readable symbol may include symbols that are not perceptible to humans but may be detected and decoded by the machine-readable symbol reader 312 and/or the control system 320. Such symbols may include, for example, digital watermarks.

Once the presence of a machine-readable symbol is detected, the machine-readable symbol reader 312 may capture one or more images of the detected machine-readable symbol. The machine-readable symbol reader 312 (and/or the control system 320 or some other processor-enabled device) may thereby decode the machine-readable symbol from the one or more images captured by the machine-readable symbol reader to obtain the encoded information. In some implementations, for example, the machine-readable symbol may be borne along an outside facing surface of one or more objects within the surrounding environment 304. The machine-readable symbol reader 312 may detect and decode such machine-readable symbols, which may provide information regarding the associated object (e.g., a SKU number that may be used to look up the associated object). The control unit 320 may use such information, for example, to confirm that the object should be retrieved, to place the item in a virtual basket of items to be/that have been retrieved, to take the item out of such a virtual basket, etc. In some implementations, the detection and/or decoding of machine-readable symbols may be performed using images captured by the image sensors 310 without the need to include a separate machine-readable symbol reader. While generally discussed in terms of an imager-type machine-readable symbol reader which may employ flood illumination or ambient lighting, scanning-type (e.g., flying spot) machine-readable symbol readers or scan engines could be employed. Such scanning-type (e.g., flying laser spot) machine-readable symbol readers or scan engines could typically scan a laser beam across the machine-readable symbol, and detect a reflected or response profile via a photodiode.

The communications subsystem 316 may include a radio 334 and an antenna 336. The antenna 336 may be any type of component or set of components that have a resonant frequency. In some implementations, the antenna 336 may comprise an inductor and one or more sets of circuitry to form a resonant circuit having a resonant frequency. Such sets of circuitry may include one or more resistors and/or capacitors that may be selectively, electrically coupled across the antenna 336 to change the resonant frequency. The radio 334 may transmit and receive electrical signals via the antenna 336. Such transmission and reception may occur through one or more wireless networks to which the radio 334 and antenna 336 may be communicatively coupled. Such a wireless network may transmit messages using one or more wireless communication protocols, such as, for example, Wi-Fi, Bluetooth, Bluetooth Low Energy, ZigBee, or any other acceptable wireless communication protocol. In some implementations, one or both of the radio 334 and the antenna 336 may be incorporated into the frame 306 of the glasses 302.

The control system 320 may take the form of any current or future developed processor-enabled device capable of executing one or more instruction sets. The control system 320 may be communicatively coupled with one or more of the image sensors 310, the user interface subsystem 314, the machine-readable symbol reader 312, and the communications subsystem 316, and may receive and/or transmit one or more electrical signals to respective subsystem and/or component. The control system 320 may include one or more processing units to execute one or more processor-readable instructions, instruction sets, or instruction blocks. The control system 320 may include a system memory to store one or more processor-readable instructions, instruction sets, or instruction blocks to be executed by the processor. Such processor-readable instructions, instruction sets, or instruction blocks may be used to capture one or more images using the image sensors 310, transmit and/or receive one or more signals using the user interface subsystem 314, emit light from the display subsystem 322 to provide a visible display for the user, and/or capture or decode machine-readable symbols from the machine-readable symbol reader 312. In some implementations, the processor-readable instructions, instruction sets, or instruction blocks may control the operation of various subsystems or components on the glasses 302. In some implementation, the control system 320 may be an off-board processor-enabled device that is communicatively coupled with the glasses 302 via a communications link using one or more wireless and/or wired communications protocols, such as, for example, Wi-Fi, Ethernet, Bluetooth, ZigBee or any other acceptable communication protocol. In some implementations, the control system 320 may be incorporated into the glasses 302.

Figure 4:
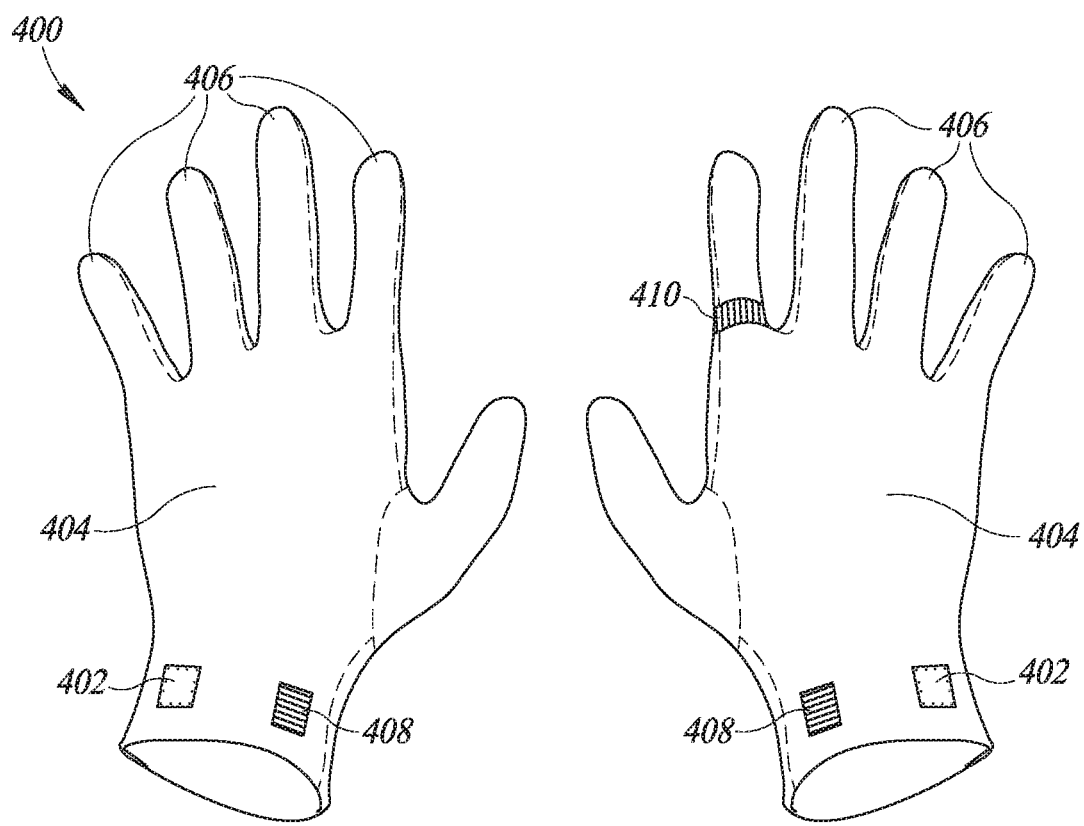
FIG. 4 is a top isometric view of a set of safety gloves that may be worn by the user, in which the safety gloves contain a transponder that may transmit encoded information that identifies the safety gloves, according to at least one illustrated implementation.

FIG. 4 shows a set of safety gloves 400, each glove 400 of which contains a transponder 402 that may transmit encoded information that identifies the safety gloves 400, according to at least one illustrated implementation. Each safety glove 400 may include a base portion 404 and one or more finger portions 406. The base portion 404 of the safety glove 400 may be sized and shaped to fit over the hand of a user. The finger portions 406 may extend outward from the base portion 404 of the glove and may be used to surround one or more fingers of the user. In some implementations, one or more of the finger portions 406 may have the tip removed to form fingerless gloves. In some implementations, one or both of the safety gloves 400 may carry or bear a machine-readable symbol 408 that may be used to encode the same or different information regarding the safety gloves 400. Such a machine-readable symbol 408 may be included, for example, along a bottom edge of the base portion 404 proximate an opening that is used to put the glove onto the hand. In some implementations, one or both of the safety gloves 400 may include a finger-mounted indicia 410 that may be used to provide gestures or to indicate features, areas, or regions of interest.

The transponder 402 may transmit encoded information as part of a machine-readable symbol. In some implementations, the transponder 402 may be a radio frequency identification ("RFID") transponder that may be excited and energized when receiving an electromagnetic wave at a resonance frequency. In response, the energized MD circuit in the transponder 402 may transmit an electromagnetic wave at the same or at a second resonance frequency. The transmitted wave from the transponder 402 may include encoded information, such as an identification string for the gloves 400. In some implementations, the identification string may identify the type of gloves. In some implementations, the identification string may uniquely identify the gloves 400 relative to other gloves that may be located in the surrounding environment.

In some implementations, as discussed below, a remote system may limit or restrict access to areas and/or equipment within an environment to a user until the user has scanned or otherwise caused the information from the transponder 402 to be transmitted to a remote processor. Such scanning or transmission may be used to confirm that the user has the necessary safety equipment before accessing the restricted area or piece of equipment. In some implementations, the user may need to bring the gloves 400 to a location that is proximate an RFID interrogator such that the RFID interrogator can excite the transponders 402 to begin transmission. Such transmission may be detected by the RFID interrogator and/or by another wearable component (e.g., the wireless communications subsystem 116 in the wearable head-worn system 100).

The gloves 400 may include the machine-readable symbol 408 that may be borne along an outer facing surface of the gloves 400. For example, the machine-readable symbol 408 may be located along an edge of the gloves proximate an opening where the hand of the user enters the glove 400. The machine-readable symbol 408 may include one-dimensional machine-readable symbols (e.g., barcode symbols) and/or two-dimensional machine-readable symbols (e.g., Quick Response symbols). In some implementations, the machine-readable symbol 408 may include symbols that are not perceptible to humans but may be detected and decoded by an image sensor. Such symbols may include, for example, digital watermarks. In some implementations, the machine-readable symbol 408 may be used to encode information, such as, for example, information regarding the glove 400. In some implementations, the encoded information may identify the type of gloves. In some implementations, the encoded information may uniquely identify the gloves 400 relative to other gloves that may be located in the surrounding environment. In some implementations, the user may scan the machine-readable symbol 408, using, for example, a machine-readable symbol reader that is communicatively coupled to a remote processor to confirm that the user has the necessary safety equipment before accessing the restricted area or piece of equipment, as noted above. Such scanning of the machine-readable symbol 408 may be performed instead of, or in addition to, transmitting the encoded information from the transponder 402.

The finger-worn indicia 410 may include one or more markings, symbols, or other indications that can be detected by an image sensor. In some implementations, such detection of the finger-worn indicia 410 by the image sensor may be used to facilitate the detection and capture of images of one or more machine-readable symbols within the environment surrounding the user. For example, in some implementations, the location or position of and/or gesture involving the finger-worn indicia 410 may be used to define a region of interest in which a machine-readable symbol is located. As such, the image sensor may capture an image of the region of interest instead of the entire field of view, thereby reducing the size of the image to be captured by the image sensor and reducing the amount of processing necessary to capture, detect, and/or decode the machine-readable symbol.

The finger-worn indicia 410 may take various forms. For example, in some implementations, the finger-worn indicia 410 may include one or more machine-readable symbols that may be borne along the surface of the finger portion 406 of the glove 400. Such machine-readable symbols may be used to encode useful information, such as a location in which the gloves 400 bearing the finger-worn indicia 410 is used or the identity of the person associated with and likely to use the gloves 400. In some implementations, the finger-worn indicia 410 may be a symbol that does not encode any information. In such an implementation, the finger-worn indicia 410 may be comprised of one or more parts to facilitate detection by the image sensor, such as, for example, through the execution of a pattern matching algorithm. Alternatively, such a symbol may be a logo or other symbol associated with an actual or potential customer to enhance the aesthetics for that customer of the gloves 400 that bear the finger-worn indicia 410. In some implementations, the finger-worn indicia 410 may include a light source, such as, for example, a light source that emits light of a certain wavelength in the visible and/or non-visible spectrum of light.

The color, texture, and/or other features of the gloves 400 may be modified to enhance the detectability of the finger-worn indicia 410. For example, in some implementations, the glove and the finger-worn indicia 410 may have a high color contrast, such as may occur when the glove is black or dark blue, and the finger-worn indicia 410 is white. The gloves 400 may be comprised of a variety of material, including rubber, leather, cloth, latex, nitrile, and vinyl. In some implementations, such gloves 400 that bear the finger-worn indicia 410 may be comprised of relatively inexpensive materials such that the gloves 400 may be disposed after one or a small number of uses.

Figure 5:
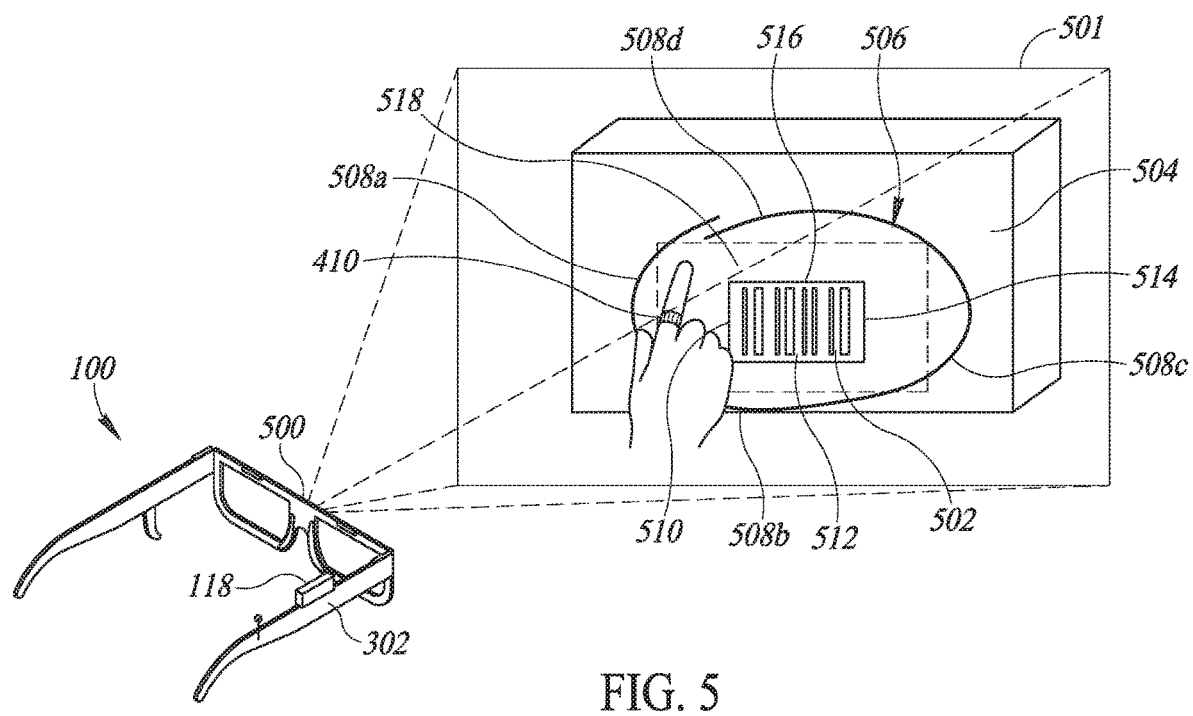
FIG. 5 is a schematic diagram showing a wearable head-worn system that includes an image sensor and a finger-worn indicia that may be used to detect and capture images of a machine-readable symbol that may be borne along a surface of an object, according to at least one illustrated implementation.

FIG. 5 shows a wearable head-worn component 100 as a set of glasses 302 that includes an image sensor 500 with a field of view 501 and a finger-mounted indicia 410 that may be used to detect and capture images of a machine-readable symbol 502 that may be home along a surface of an object 504, according to at least one illustrated implementation. The finger-mounted indicia 410 may be used in forming a gesture 506 that is represented by a number of movements 508a through 508d (collectively, movements 508) of the finger-worn indicia 410, according to at least one illustrated implementation. The movements 508 may be proximate the machine-readable symbol 502, which may have a left edge 510, a bottom edge 512, a right edge 514, and a top edge 516. The gesture 506 may begin with a first movement 508a in which the finger-worn indicia 410 moves in a relatively downward direction proximate the left edge 510 of the machine-readable symbol 502. The finger-worn indicia 410 may then be transitioned to a second movement 508b once the finger-worn indicia 410 moves past the bottom edge 512 of the machine-readable symbol 502, at which point the finger-worn indicia 410 is swept in a rightward direction proximate the bottom edge 512. The gesture 506 may transition to a third movement 508c when the finger-worn indicia 410 moves past the right edge 514 of the machine-readable symbol 502. At this point, the finger-worn indicia 410 may begin to move in a relatively upward direction proximate the right edge 514 of the machine-readable symbol 502. The gesture 506 may transition to a fourth movement 508d when the finger-worn indicia 410 moves past the top edge 516 of the machine-readable symbol 502, at which point the finger-worn indicia 410 begins to move in a leftward direction proximate the top edge 516 of the machine-readable symbol 502. The gesture 506 may end when finger-worn indicia 410 moves past the left edge 510 of the machine-readable symbol 502.

The control system 118 may detect an occurrence of the gesture 506 based upon the movement of the finger-worn indicia 410 across a plurality of images of the field of view 501 captured by the image sensor 500. In some implementations, the plurality of images may be comprised of successive images taken over a period of time during which the finger-worn indicia 410 performs the gesture 506. By detecting the successive positions of the finger-worn indicia 410 over successive images, the control system 118 may construct a trace of the movements 508 by the finger-worn indicia 410. The control system 118 may identify the gesture 506 by comparing the constructed trace with a set of possible traces stored, for example, in non-transitory memory in which each possible trace is associated with a different gesture, in such an implementation, each gesture may have an associated function or operation to be executed by the control system 118 when the control system 118 detects the respective gesture. For example, the gesture 506 may define a region of interest 518 in which the control system 118 may search for one or more machine-readable symbols 502. When the control system 118 detects an occurrence of the gesture 506, the control system 118 may attempt to detect and decode the one or more machine-readable symbols 502 included within the region of interest 518. Additional gestures may be associated with other functions, which may include, for example, adding a representation of the object 504 associated with the detected machine-readable symbol 502 to a virtual basket; removing a representation of the object 504 associated with a detected machine-readable symbol 502 from a virtual basket; requesting information regarding the object 504 associated with the detected machine-readable symbol 502; defining a remote host to transmit captured, detected, and/or decoded information; and/or an additional, separate gesture to identify a communication channel (e.g., Bluetooth, Wi-Fi, ZigBee). Each of these functions may be associated with a separate gesture within the set of gestures. The set of gestures may be used to form a gesture recognition policy that may be executed by the control system 118 or some other processor-enabled device.

Figure 6:
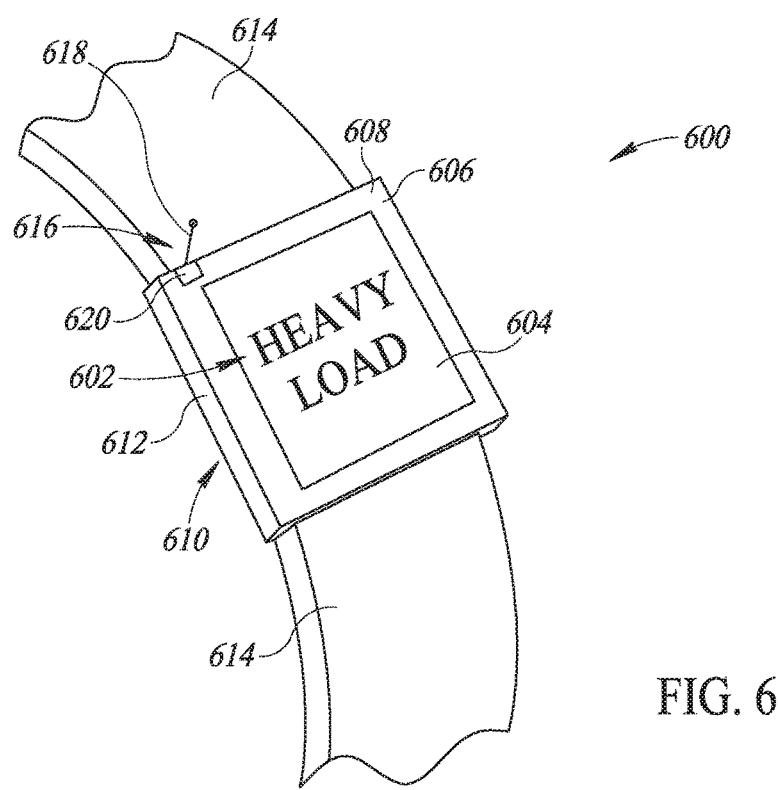
FIG. 6 is a top, left isometric view of a wearable display that may be mounted on an arm or wrist of a user, in which the wearable display may render messages for the user, according to at least one illustrated implementation.

FIG. 6 shows a wearable display 600 that may be mounted or worn on an arm or wrist of a user, in which the wearable display 600 may render one or more messages 602 on a screen 604 for the user, according to at least one illustrated implementation. The wearable display 600 may include a body 606 and one or more straps 614 that may fit over a wrist of the user. The body 606 may have an outward facing side 608, an opposing inward facing side 610, and a side wall 612 that extends there between. The body may be comprised of one or more of plastic, metal, or some other durable material. The strap 614 may be comprised of one flexible strap that may expand to fit over the hand of the user, and then constrict to securely fit over the wrist. In some implementations, the straps 614 may be comprised of two opposing straps 614 located on opposite ends of the body 606. One of the straps 614 may have a latch, and the other strap 614 may have one or more apertures that may be used to secure the latch. The strap may be comprised of plastic or some other flexible, durable material, or of metal links.

The wearable display 600 may include a wireless communications subsystem 616 that may be used to communicate with other devices, systems, and/or components via a wireless network. The wireless communications subsystem 616 may include a radio 618 and an antenna 620. The antenna 620 may be any type of component or set of components that have a resonant or adjustable resonant frequency. In some implementations, the antenna 620 may comprise an inductor and one or more sets of circuitry to form a resonant circuit having a resonant frequency. Such sets of circuitry may include one or more resistors and/or capacitors that may be selectively, electrically coupled across the antenna 336 to change the resonant frequency. The radio 618 may transmit and receive electrical signals via the antenna 620. Such transmission and reception may occur through one or more wireless networks to which the radio 618 and antenna 620 may be communicatively coupled. Such a wireless network may transmit messages using one or more wireless communication protocols, such as, for example, Wi-Fi, Bluetooth, Bluetooth Low Energy, ZigBee, or any other acceptable wireless communication protocol. In some implementations, one or both of the radio 618 and the antenna 620 may be incorporated into the body 606 of the wearable display 600.

The screen 604 may be located along at least a portion of the outward facing side 608. The screen 604 may be comprised of one or more components, such as a liquid crystal display, a set of light emitting diodes (LEDs), a set of organic light emitting diodes, a set of micro-LEDs, or some other display technology, that may be used to render images on the screen 604. The screen 604 may be electrically and communicatively coupled to a display circuit (not shown) that may be used to control the components of the screen 604 to render images (e.g., text, symbols) on the screen 604. The screen 604 and/or display circuit may be electrically and/or communicatively coupled to the wireless communications subsystem 616. As such, the images rendered on the screen 604 may be based, at least in part, upon signals received via the wireless communications subsystem 616. In some implementations, for example, the message 602 to be displayed on the screen 604 may be based upon one or more signals generated by the control system 118 on the wearable head-worn component 100 and transmitted to the wearable display 600 via the wireless communications subsystem 616. In some implementations, the message 602 to be displayed on the screen 604 may be based upon one or more signals generated by a remote processor-enabled device and transmitted to the wearable display 600 via the wireless communications subsystem 616. Such messages 602 may be related, for example, to the environment surrounding the wearable display 600, to an object to be retrieved, and/or to the user wearing the wearable display 600.

Figure 7:
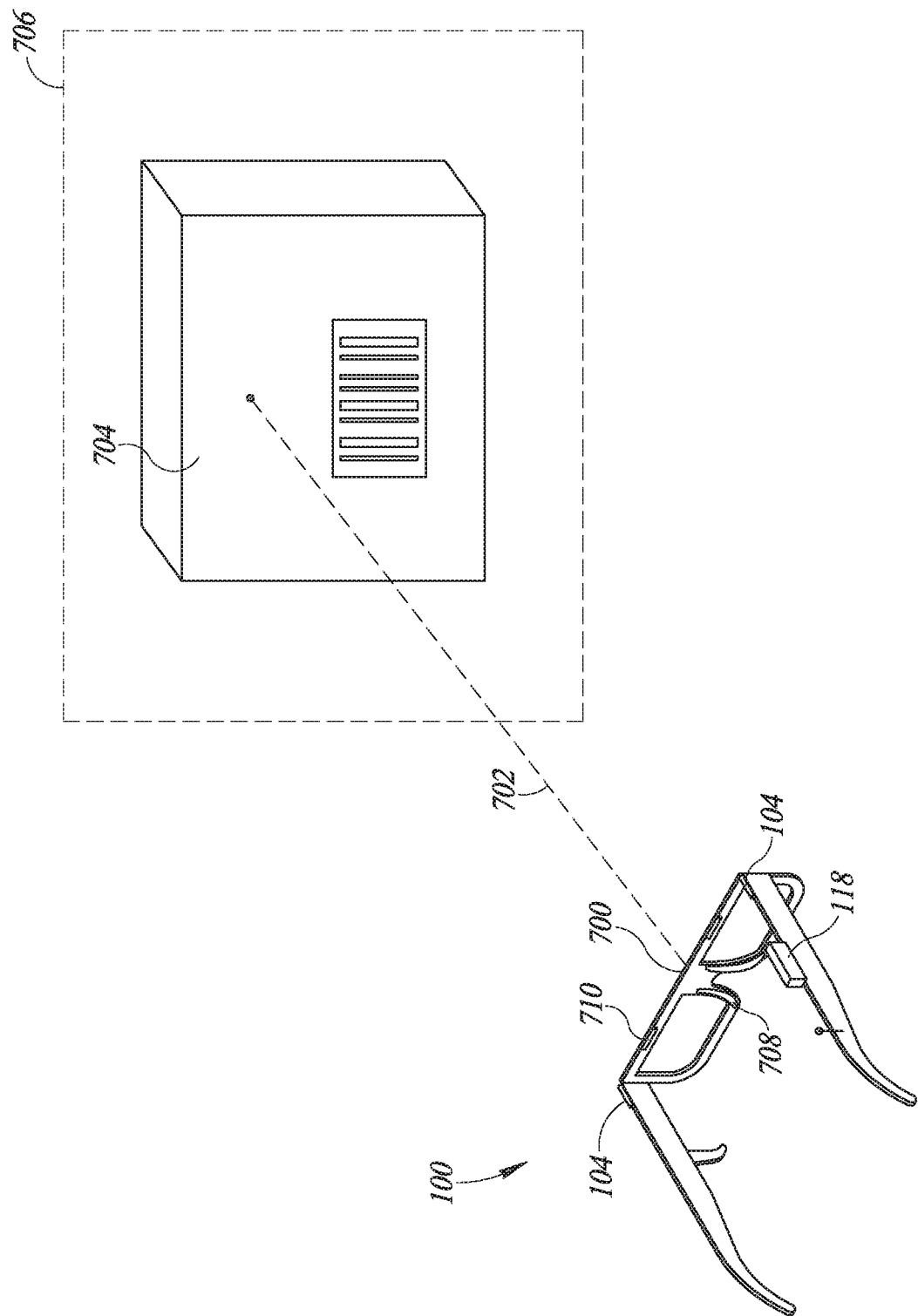
FIG. 7 is a schematic diagram showing a wearable head-worn system that includes a range-finder that may be used to determine a distance to an object, according to at least one illustrated implementation.

FIG. 7 shows a wearable head-worn component 100 that includes a range-finder 700 that may be used to determine a distance 702 from the range-finder 700 to an object 704, according to at least one illustrated implementation. The range-finder 700 may be positioned and oriented to detect the distance 702 to objects 704 located within an image-sensor field-of-view 706. In some implementations, the distance 702 calculated by the range-finder 700 may be a singular distance (e.g., 3 meters). In some implementations, the distance 702 calculated by the range-finder 700 may be a distance range (e.g., between 3 and 3.5 meters). In some implementations, the range-finder 700 may generate and transmit a digitized representation of the detected distance 702. The distance-related signal may be transmitted to the control system 118. Alternatively, or in addition, the range-finder 700 may generate a signal that has a voltage value indicative of the distance 702 between the range-finder and the object 704. For example, in some implementations, a voltage of the signal generated by the range-finder 700 may be directly proportional to the distance 702 of the object 704 from the range-finder 700. In such an implementation, the distance 702 determined by the range-finder 700 may be used in conjunction with other components (e.g., the three dimensional representation provided by the image sensors 104) more accurately determine the location of the object 704.

The range-finder 700 may be implemented by an emitter-collector pair that transmits a light, ultra-sonic, electromagnetic or other suitable signal towards the object 704 using an emitter and detects the amount of time that lapses until at least a portion of the transmitted signal that has reflected or returned from the object 704 is received at a collector. The signal may have a temporal or frequency or wavelength pattern imposed thereon, for example to facilitate detection of the returned signal from ambient signals. In some implementations, a proximity sensor, such as a capacitive, photoelectric, inductive, or Hall Effect sensor, may be used to detect the distance or a distance range of an object to the range-finder 700. In some implementations, for example, the range-finder 700 may detect the distance to the object 704 based upon the amount of light that has been reflected from the object 704.

In some implementations, the wearable head-worn component 100 may include one or more of a facial gesture recognition subsystem 708 or an eye-tracking subsystem 710. The facial gesture recognition subsystem 708 may be used to capture and detect facial gestures of a user who is wearing the wearable head-worn system 100. Such facial gestures may be used to by the control system 118 when executing functions, processes, and/or applications. The eye-tracking subsystem 710 may be used to generate one or more signals based upon tracking the location of one or both eyes of the user. Such signals may be used, for example, to modify the light sources 114 used by the display subsystem 112 to generate images to be projected for the user.

Figure 8:
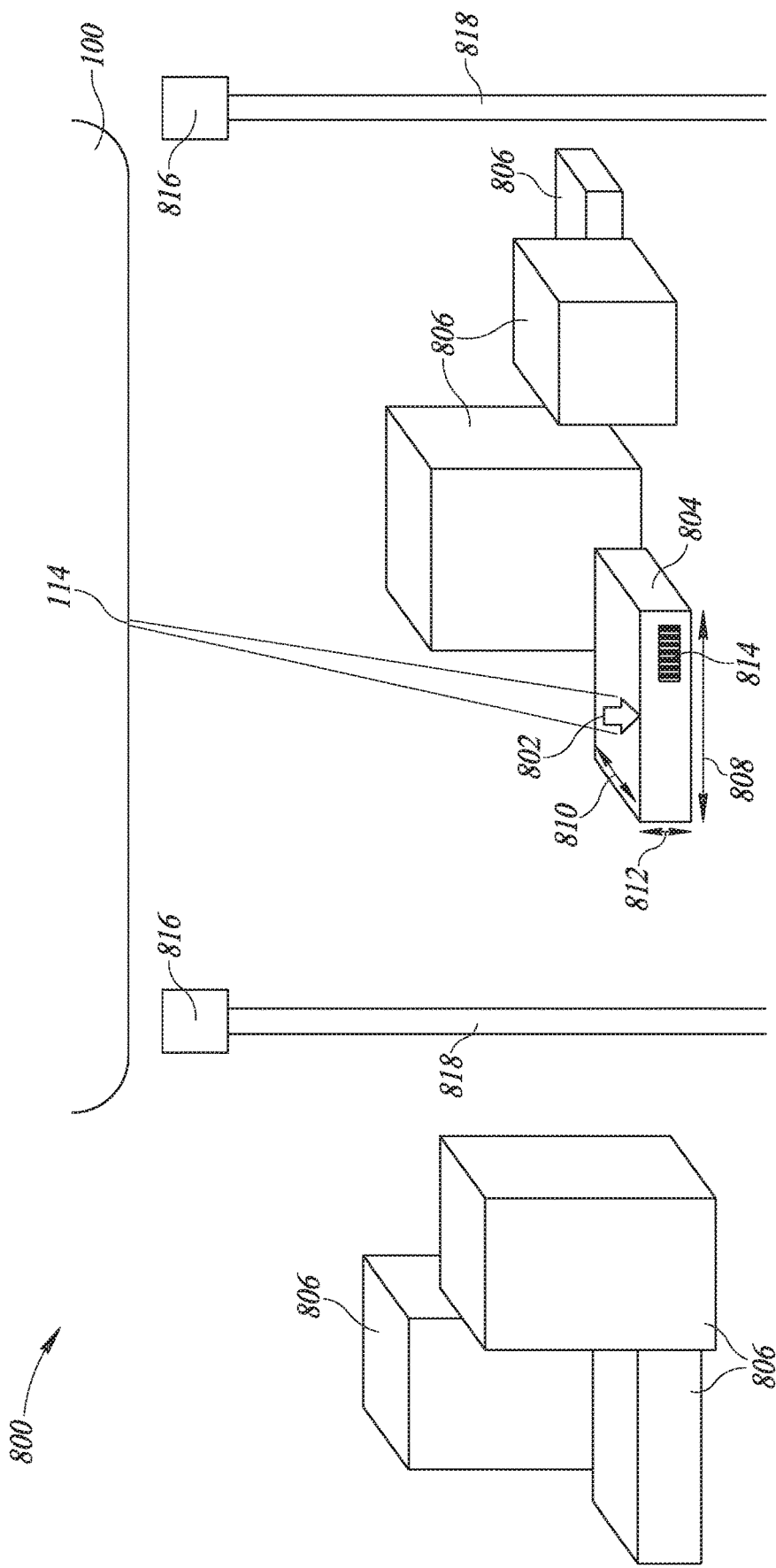
FIG. 8 is a schematic diagram of a view from one of the wearable head-worn components in which a light source projects a display onto an object to identify the object as one to be retrieved by the user, according to at least one illustrated implementation.

FIG. 8 shows a view of a surrounding environment 800 from the wearable head-worn component 100 in which the light sources 114 project a display 802 onto an object 804 in the surrounding environment 800 to identify the object 804 as one to be retrieved by the user, according to at least one illustrated implementation. The environment 800 may include a plurality of other objects 806 that are not to be retrieved by the user. In such an implementation, the user may have received a list of objects to be retrieved from the environment 800. As such, the user may have received instructions, such as navigation or route instructions, that describe a potential route for retrieving the objects, including the object 804, from the surrounding environment 800. Such route instructions may have been used to direct the user to a location that is within the immediate vicinity of the object 804 to be retrieved. Once the user is in the immediate vicinity of the object 804 to be retrieved, one or more components in the wearable head-worn component 100 may be used to specify the object 804. In some implementations, for example, the images captured by the image sensors 104 may be used by a processor-enabled device, such as the control system 118 and/or a remote processor-enabled system, to construct a three-dimensional representation of the environment 800 surrounding the wearable head-worn component 100. Such a three-dimensional representation may determine a representation of the dimensions of each of the objects within the surrounding environment, including a length 808, a width 810, and a height 812 of the object 804. The processor-enabled device may compare these determined dimensions with a set of stored dimensions related to the object on the list provided to user. If the measured dimensions from the three-dimensional model match the stored dimensions, the processor-enabled device may identify the object 804 as the one to be retrieved. In some implementations, the processor-enabled device may use an alternative or an additional factor to authenticate an object as one to be retrieved. For example, in some implementations, the processor-enabled device may confirm that the object 804 is the object on the list provided to the user by detecting and decoding a machine-readable symbol 814 that is borne along one of the surfaces of the object 804. The processor-enabled device may compare the decoded information from the machine-readable symbol 814 with a set of stored information associated with the object on the list provided to the user to confirm that object 804 is to be retrieved by the user.

The light sources 114 may project a display 802 onto the object 804 to be retrieved once the processor-enabled device has confirmed that the object 804 is included on the list of objects to be retrieved by the user. In such an implementation, the display 802 may be an arrow that is placed onto the object 804 to be retrieved. In some implementations, the display 802 may be a defined color and/or symbol, such as a green arrow, that may identify the object 804 to be retrieved. Such light sources 114 may include modifiable and/or movable elements that may be used to maintain the display 802 on the appropriate object 804 even as the head of the user moves.

In some implementations, the display 802 may be projected from a remote external light source 816 that may be located in an elevated position above the environment 800 surrounding the user. For example, in some implementations, a plurality of remote external light sources 816 may be located in elevated positions on top of posts 818 or suspended from a ceiling. In such an implementation, a remote processor-enabled device may track a current location of the user relative to the object 804 to be retrieved. When the user is near the object 804, one or more subsystems on the wearable head-worn component 100 may identify and determine the location of the object 804. Such location information may be transmitted to the remote processor-enabled device, which may control one or more of the external light sources 816 to project the display 802 onto the appropriate object 804. Such an implementation may advantageously be used to project the display 802 onto the appropriate object 804 independently of any movement by the user of the wearable head-worn component 100 or of the associated light sources 114 on the wearable head-worn component 100. Such a display 802 may alternatively, or in addition, provide instructions ("Use Forklift") and/or warnings ("Fragile") for the object 804 that may be projected onto the object 804. Such a display 802 may alternatively, or in addition, provide navigation instructions that may be projected, for example, onto a floor in the environment 800 surrounding the wearable head-worn component 100.

Figure 9:
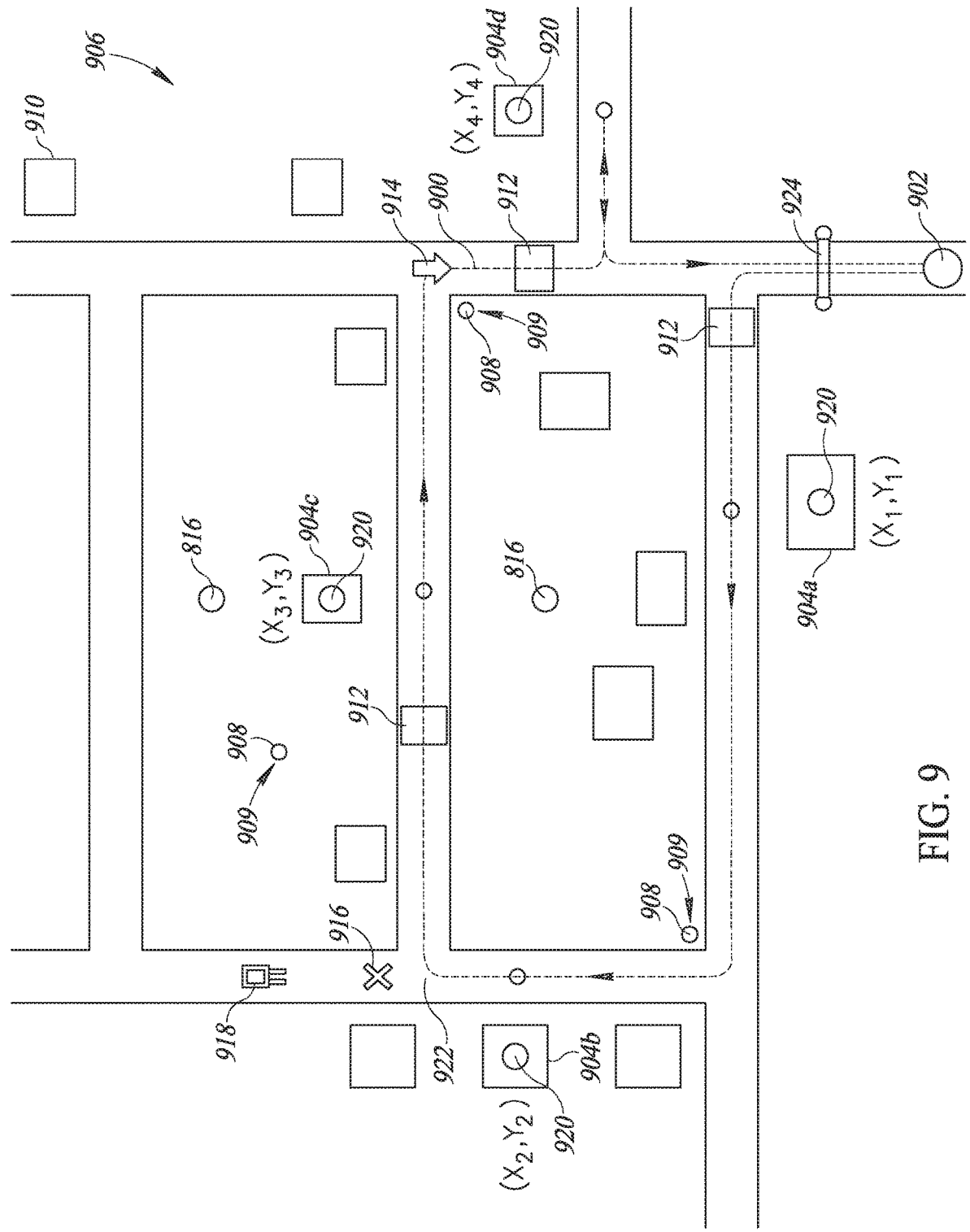
FIG. 9 is a schematic diagram of a mapped route for a user of a user-wearable system to take to retrieve multiple objects from an environment, according to at least one illustrated implementation.

FIG. 9 shows a mapped route 900 for a user of a user-wearable system 902 to take to retrieve multiple objects 904 from an environment 906, according to at least one illustrated implementation. The user-wearable system 902 may include a wireless communication subsystem 116 that wirelessly couples the user-wearable system 902 to a wireless communications network via one or more wireless access points 908. Such wireless access points 908 may communicate using one or more wireless transmission protocols, such as Bluetooth, Wi-Fi, and/or ZigBee. In some implementations, the wireless access points 908 may be used to communicatively couple the user-wearable system 902 with a remotely located control system 910. As such, some or all of the functions, processes, and application described may be executed by either or both of the control system 118 on the user-wearable system 902 and/or by the remotely located control system 910.

In some implementations, the wireless access points 908 may be used as navigation beacons 909 to provide location information regarding the user-wearable system 902. In some implementations, alternatively, the navigation beacons 909 may be separate from the wireless access points 908 that provide access to a wireless network. Such location information may be based upon the signal strength of wireless transmissions received from the wireless communications subsystem 116 on the user-wearable system 902 at a plurality of at least three navigation beacons 909 by using well-known triangulation methods. In some implementations, additional systems and/or methods may be used to provide locations information regarding the user-wearable system 902. For example, some implementations may include one or more RFID interrogators 912 at one or more locations within the environment 906. In some implementations, such RFID interrogators 912 may be implemented using posts that flank the sides of passages or paths in the environment 906, and/or by mats that users may walk over. In some implementation, such mats may be incorporated into the floor of the environment 906 so that such mats may be unnoticed by the users. The RFID interrogators 912 may energize the RFID transponders 207 in the identification module 206 that may be incorporated into one or more components of the user-wearable system 902. Such RFID transponders 207 may emit a signal that may be detected by the MD interrogators 912 and used to identify the location of the user-wearable system 902 at that moment. Such location information that may be obtained via the RFID interrogators 912 may be used to update, modify, and/or correct the location information provided by other methods, such as, for example, triangulation using the wireless access points 908.

The mapped route 900 may be determined based upon one or more criteria. For example, in some implementations, the mapped route 900 may be determined based upon a shortest route and/or a shortest travel time analysis based upon the locations of each of the objects 904 to be retrieved. In some implementations, the mapped route 900 may be determined such that the user will retrieve the heaviest and/or bulkiest item last, to reduce the amount of time that the user will need to travel with such an object. In some implementations in which objects are located on different floors, the mapped route 900 may reduce the amount of time traveling on conveyances (e.g. elevators, escalators) or stairs between floors. In some implementations, the mapped route 900 may have the user retrieve refrigerated and/or perishable food items last or towards the end of the mapped rout 900 to reduce the possibility of such food items spoiling. In some implementations, the mapped route 900 may be continuously updated and potentially modified when the user is in the midst of traveling the route 900. Such updates may be based, for example, upon changed conditions (e.g., an accident within the environment 906 along or proximate the mapped route 900). Such updates may be transmitted to the user-wearable system 902 to be provided to the user.

In some implementations, the user-wearable system 902 may provide to the user information regarding the mapped route 900 and/or the objects 904 to be retrieved. In some implementations, such information may be provided via audible cues provided by the user interface system 108. Such audible cues may be comprised of directions ("Turn Left,"

"Proceed Straight"), warnings ("STOP:"; "EVACUATE"), and information about the objects 904 ("Heavy Load"; "Use forklift"; "Fragile Load"). In some implementations, such information may be provided by displays projected into the environment 906 by the display subsystem 112. In such an implementation, one or more images, such as text or symbols, may be projected onto surfaces present within the environment 906. Such images may include, for example, one or more directional symbols 914 that may be projected onto a floor or pathway within the environment 906 to indicate a direction in which the user is to proceed to travel along the mapped route 900. In some implementations, such images may include one or more warning symbols 916 that may be used to warn the user away from dangerous areas (e.g., the area being worked by a forklift 918). In some implementations, such images may include a symbol or text 920 regarding an object 904 to be retrieved. Such text 920 may include warnings regarding the handling of the object 904, such as that the object 904 is heavy or fragile, for example. In such an implementation, the text 920 may be projected onto the object 904. In some implementations, some or all of the displays projected into the environment 906 may be projected by external light sources 816 located in fixed locations throughout the environment 906. As such, the external light sources 816 may be communicatively coupled to the remotely located control system 910. The remotely located control system 910 may transmit one or more signals that control the displays projected from the external light sources 816 based upon a current location of the user relative to the locations of the respective objects 904 to be retrieved.

In some implementations, the remotely located control system 910 may be used to promote safety in the environment 906. For example, in some situations, two workers may be heading into a blind intersection from different directions, such as may occur, for example, when the forklift 918 and the user wearing the user-wearable system 902 are both heading toward an intersection 922. If the forklift 918 and the user may collide, the remotely located control system 910 may transmit one or more signals to one or both of the forklift 918 and the user-wearable system 902 to prevent such a collision. For example, in some implementations, the remotely located control system 910 may transmit signals causing an alert to be provided to the user via the user-wearable system 902. Such an alert may include an audible cue (e.g., "STOP!") transmitted via the user interface system 108 and/or a visual display (e.g., a flashing, red "X" projected along the path to the intersection 922) projected by the external light sources 816 or the light sources 114. In some implementations, the remotely located control system 910 may transmit one or more signals to the forklift 918 that may cause the forklift 918 to stop before reaching the intersection 922 to thereby prevent a collision with the user.

In some implementations, the remotely located control system 910 may take other preventative actions. For example, in some implementations, the remotely located control system 910 may detect that a user is falling based upon signals received, for example, from the pose determination subsystem 204. In such an implementation, the remotely located control system 910 may transmit one or more signals that cause all machinery located in the vicinity of the user to immediately shut-down in an attempt to protect the falling user. In some implementations, the remotely located control system 910 may control access to portions of the environment 906 via, for example, a selectively securable access point 924, such as a gate or a door. In such an implementation, the remotely located control system 910 may maintain the selectively securable access point 924 in a locked position to prevent access to the environment 906. The remotely located control system 910 may maintain the selectively securable access point 924 until the remotely located control system 910 receives confirmation that the user has been dressed or otherwise outfitted with appropriate and/or necessary safety equipment for entering the environment 906. Such confirmation may be received, for example, by exciting the transponders (e.g., transponders 402 on the set of safety gloves 400) and/or scanning the machine-readable symbols (e.g., machine-readable symbol 408) that may be incorporated into and/or borne along a surface of the safety equipment. Once confirmation has been received, the remotely located control system 910 may transmit one or more signals to unlock the selectively secured access point 924 to provide access to environment 906.

Figure 10:
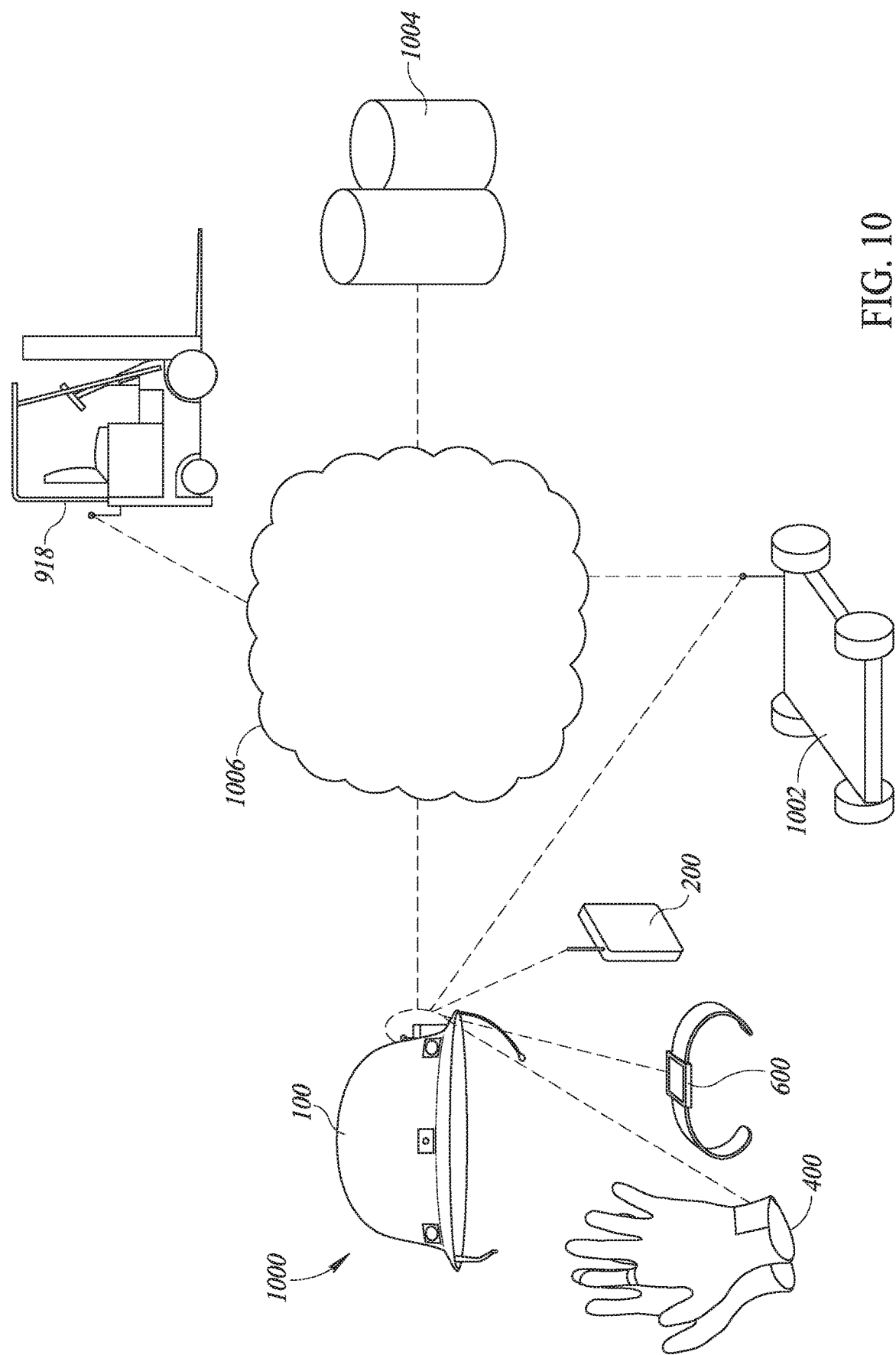
FIG. 10 is a schematic diagram of a wearable system that may be used to provide information to a user, in which the wearable system may include one or more wearable components, and may be communicatively coupled to a semi-autonomous vehicle, a forklift, and a remote system, according to at least one illustrated implementation.

FIG. 10 shows a wearable system 1000 that may be used to provide information to a user, in which the wearable system 1000 may include one or more of the wearable head-worn component 100, the clip-mounted component 200, the set of safety gloves 400, and the wearable display 600. The wearable system 1000 may be communicatively coupled to a semi-autonomous vehicle 1002, a forklift 918, and a remotely located control system 1004, according to at least one illustrated implementation. In some implementations, one or more components of the wearable system 1000 (e.g., the wearable head-worn component 100), the forklift 918, and the remotely located control system 1004 may be wirelessly, communicatively coupled via a wireless network 1006. Such a wireless network 1006 may transmit messages via one or more types of wireless protocols, such as Bluetooth, Wi-Fi, Bluetooth Low Energy, ZigBee, or some other type of wireless communication protocol. In some implementations, each of the wearable clip-mounted component 200, the set of safety gloves 400, and/or the wearable display 600 may be communicatively coupled with the wearable head-worn component 100 via a short-range, wireless communication network, such as ZigBee, or some other similar type of network. In some implementations, the semi-autonomous vehicle 1002 may be communicatively coupled directly to one or more components of the wearable system 1000 and/or to the wireless network 1006.

In such an implementation, the semi-autonomous vehicle 1002 may receive control signals from the control system 118 on the wearable head-worn component 100 that may be used to control the operation of the semi-autonomous vehicle 1002. In some implementations, the control signal may be based at least in part on gestures involving the finger-mounted indicia 410. In such an implementation, the gestures may be captured and detected by the image sensors 104 on the wearable head-worn component 100. The control system 118 may generate and transmit the signals to control the operation of the semi-autonomous vehicle 1002 based at least in part upon such detected gestures. Such gestures may include, for example, pointing forward an index finger that bears the finger-mounted indicia 410 to move the semi-autonomous vehicle 1002 forward, and holding up the index finger that bears the finger-mounted indicia 410 to stop the semi-autonomous vehicle 1002.

In some implementations, the remotely located control system 1004 may receive signals from one or more components of the wearable system 1000, such as, for example, the wearable head-worn component 100, the clip-mounted component 200, and the set of safety gloves 400. Such signals may be generated, for example, by the image sensors 104, one or more audio transducers 108, the pose determination subsystem 204, the machine-readable symbol reader 312, the range-finder 700, the facial gesture recognition subsystem 708, and the eye-tracking subsystem 710. Such signals may be received by the remotely located control system via the network 1006. In some implementations, the control system 1004 may generate one or more signals that may be transmitted to one or both of the forklift 918 and/or to the wearable system 1000. Such signals may be used to control the operation of the forklift 918, as described above. Such signals may be used to provide information that may be displayed via one or more components of the wearable system 1000 (e.g., the audio transducer 108, the display subsystem 112, and/or the screen 604 on the wearable display 600).

Figure 11:
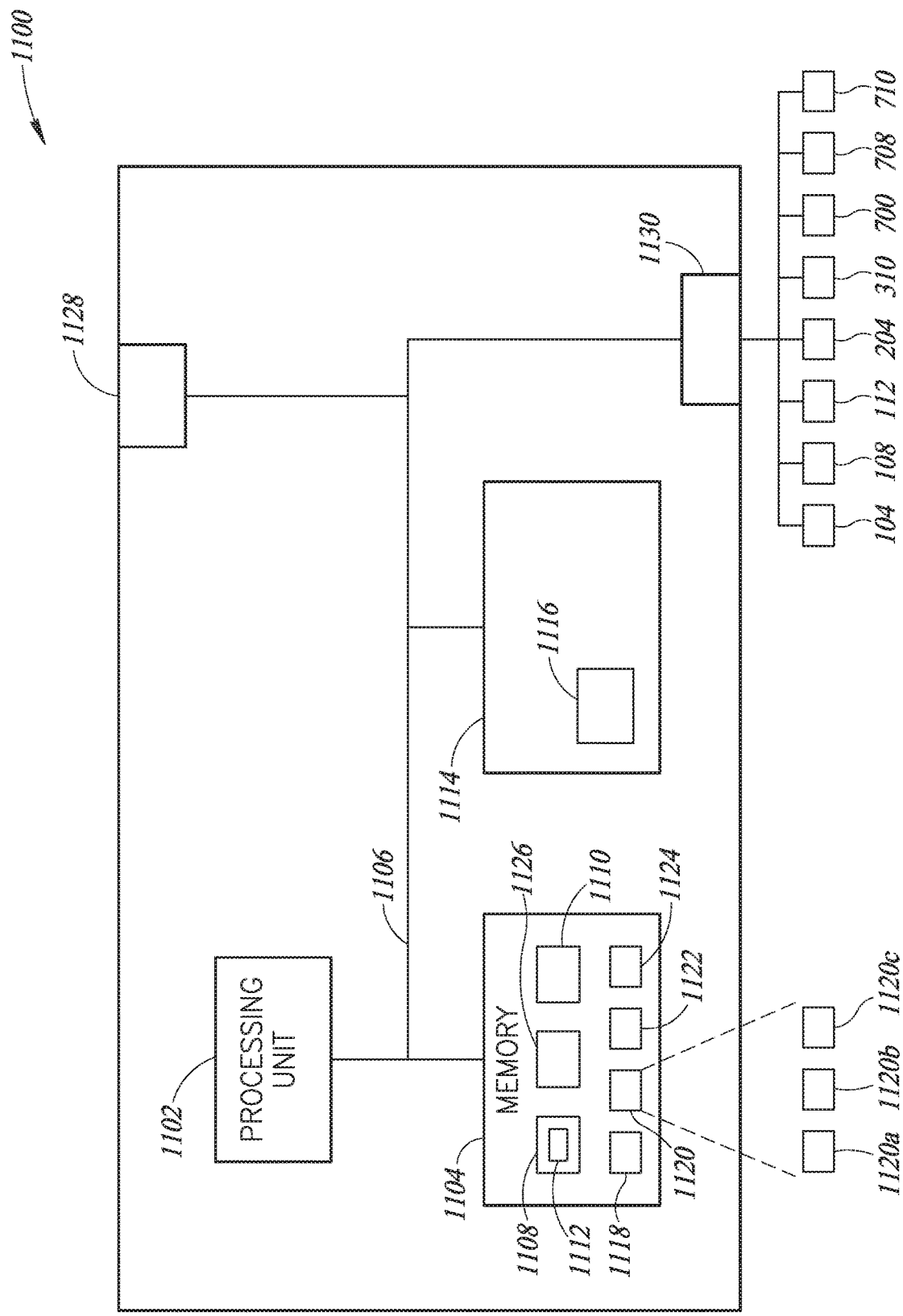
FIG. 11 is a schematic diagram of a control system that may be used to provide information to and collect information from a wearable system, according to at least one illustrated implementation.

FIG. 11 shows a block diagram of a control system 1100, according to at least one illustrated implementation. Such a control system 1100 may be used as part of, or to implement, one or more of the control system 118 associated with the wearable head-worn component 100 and/or the remotely located control system 1004, for example. The control system 1100 may take the form of any current or future developed computing system capable of executing one or more instruction sets. The control system 1100 includes a processing unit 1102, a system memory 1104 and a system bus 1106 that communicably couples various system components including the system memory 1104 to the processing unit 1102. The control system 1100 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 1102 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. Unless described otherwise, the construction and operation of the various blocks shown in FIG. 11 are of conventional design. As a result, such blocks need not be described in further detail herein, as they will be understood by those skilled in the relevant art. In some implementations, some or all of the processing unit 1102, the memory 1104, and one or more other components discussed below may be included within a single integrated circuit, such as may occur, for example, with a system on chip (SoC).

The system bus 1106 can employ any known bus structures or architectures, including a memory bus with memory controller, a peripheral bus, and a local bus. The system memory 1104 includes read-only memory ("ROM") 1108 and random access memory ("RAM") 1110. A basic input/output system ("BIOS") 1112, which can form part of the ROM 1108, contains basic routines that help transfer information between elements within the control system 1100, such as during start-up. Some implementations may employ separate buses for data, instructions and power.

The control system 1100 also includes one or more internal nontransitory storage systems 1114. Such internal nontransitory storage systems 1114 may include, but are not limited to, any current or future developed persistent storage device 1116. Such persistent storage devices 1116 may include, without limitation, magnetic storage devices such as hard disc drives, electromagnetic storage devices such as memristors, molecular storage devices, quantum storage devices, electrostatic storage devices such as solid state drives, and the like.

The one or more internal nontransitory storage systems 1114 communicate with the processing unit 1102 via the system bus 1106. The one or more internal nontransitory storage systems 1114 may include interfaces or device controllers (not shown) communicably coupled between nontransitory storage system and the system bus 1106, as is known by those skilled in the relevant art. The nontransitory storage systems 1114 and associated storage devices 1116 provide nonvolatile storage of computer-readable instructions, data structures, program modules and other data for the control system 1100. Those skilled in the relevant art will appreciate that other types of storage devices may be employed to store digital data accessible by a computer, such as magnetic cassettes, flash memory cards, RAMS, ROMs, smart cards, etc.

Program modules can be stored in the system memory 1104, such as an operating system 1118, one or more application programs 1120, other programs or modules 1122, drivers 1124 and program data 1126.

The application programs 1120 may include, for example, one or more machine executable instruction sets (i.e., gesture recognition policy 1120a) capable of detecting gestures involving finger-worn indicia 410 in images captured, for example, by the image sensors 104. The application programs 1120 may include, for example, one or more machine executable instruction sets (i.e., three-dimensional shape detection 1120b) capable of detecting objects using three-dimensional shape recognition and detection. The application programs 1120 may include, for example, one or more machine executable instruction sets (machine-readable symbol decoding library 1120c) capable of decoding the machine-readable symbols that are included within images captured, for example, by the image sensor 104. The application programs 1120 may be stored as one or more executable instructions.

In some embodiments, the control system 1100 operates in an environment using one or more of the network interfaces 1128 to optionally communicably couple to one or more remote computers, servers, display devices, via one or more communications channels. These logical connections may facilitate any known method of permitting computers to communicate, such as through one or more LANs and/or WANs. Such networking environments are well known in wired and wireless enterprise-wide computer networks, intranets, extranets, and the Internet.

Further, local communication interface 1130 may be used for establishing communications with other components in a local device, such as may occur, for example, when the control system 1100 is associated with the wearable head-mountable component 100. For example, the local communication interface 1130 may be used to communicate with one or more of the image sensors 104, one or more audio transducers 108, the display subsystem 112, the pose determination subsystem 204, the machine-readable symbol reader 312, the range-finder 700, the facial gesture recognition subsystem 708, and the eye-tracking subsystem 710.

Figure 12:
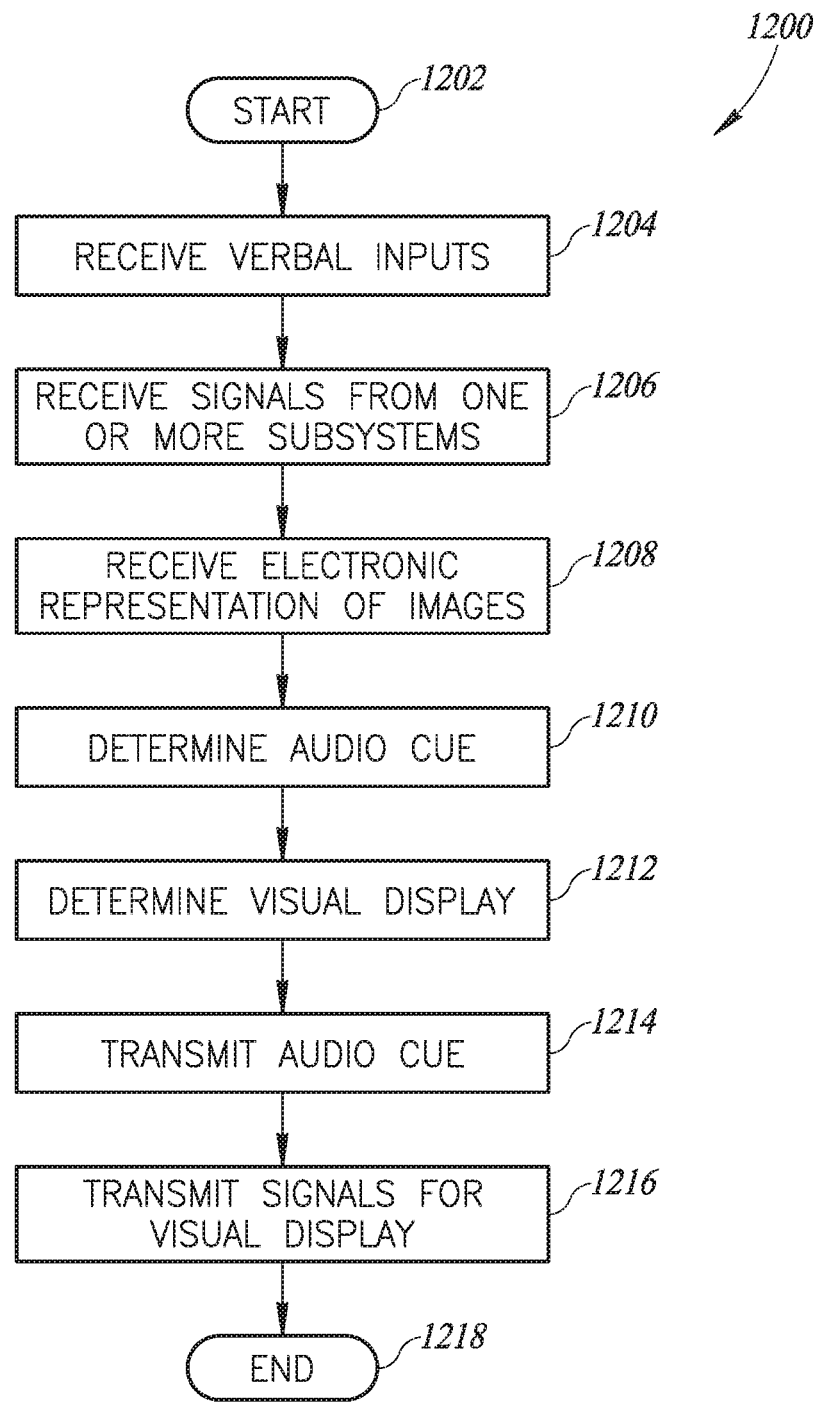
FIG. 12 is a logic flow diagram of a method of implementing a user-wearable system that may be used to collect information from the environment that at least partially surrounds the user-wearable system and to provide information (e.g., cues and displays) via one or more components on the user-wearable system, according to at least one illustrated implementation.

FIG. 12 shows a method 1200 of implementing a wearable system 1000 that may be used to collect information from the environment that at least partially surrounds the wearable system 1000 and to provide information (e.g., cues and displays) via one or more components on the wearable system 1000, according to at least one illustrated implementation. The method 1200 starts at 1202, at which a processor enabled device, for example, the control system 118 and/or the remotely located control system 1004, activates one or more components of the wearable system 1000.

At 1204, the processor enabled device, for example, the control system 118 and/or the remotely located control system 1004, may receive a verbal input from a user. Such a verbal input may include, for example, audible commands. Such verbal input may be received via one or more transducers (e.g., the first audio transducer 108 and/or the second audio transducer 110) from the user interface subsystem 106. Such a transducer may include a microphone 130 that may be positionable proximate a mouth of the user to detect audible sounds spoken by the user. The microphone 130 may be used to receive such audible sounds and to transform the audible sounds to electrical signals that are transmitted to the processor enabled device.

At 1206, the processor-enabled device, such as, for example, the control system 118 and/or the remotely located control system 1004, may receive one or more signals from one or more subsystems that may be part of the wearable system 1000. Such signals may be related, for example, to a position and/or orientation of the user as determined by the pose determination subsystem 204, to a facial gesture as determined by the facial gesture recognition subsystem 708, and/or to eye position as determined by an eye-tracking subsystem 710. In some implementations, each of the pose determination system 204, the facial gesture recognition subsystem 708, and the eye-tracking subsystem 710 may be communicatively coupled to the control system 118 that may be located, for example, on the wearable head-worn component 100. Such signals may be transmitted from the wearable head-worn component 100 to other processor-enabled devices, such as the remotely located control unit 1000, via the wireless communications subsystem 116 and the wireless network 1006.

At 1208, the processor-enabled device, such as, for example, the control system 118 and/or the remotely located control system 1004, may receive electronic representations of images captured, for example, by the image sensors 104. Such images may be, for example, of the environment surrounding the wearable system 1000. In some implementations, the each of the images may be a two-dimensional representation of the surrounding environment. In some implementations, the two-dimensional representations may be captured by at least two image sensors 104 that may be separated by a distance. As such, corresponding images from each sensor 104 may be combined by the processor-enabled device to form a three-dimensional image of the environment surrounding the wearable system 1000.

At 1210, the processor-enabled device, such as, for example, the control system 118 and/or the remotely located control system 1004, may determine an audio cue to transmit to the wearable system 1000 based upon one or more of the inputs received at 1204, the signals received at 1206, and the electronic representations received at 1208. Such audio cues may be related, for example, to navigation information for moving towards an objective location (e.g., location of an object to be retrieved). Such navigation information may include, for example, directional information ("Forward"; "Turn Left") and/or safety information for moving towards the objective location ("Stop Now!"; "Evacuate"). In some implementations, such audio cues may include information about an object to be retrieved, such as handling information ("Fragile") and/or transporting information ("Heavy Load Team Lift"). Such audio cues may be provided at the wearable system 1000 by one or more of the transducers 108, 110 at the user interface subsystem 106.

At 1212, the processor-enabled device, such as, for example, the control system 118 and/or the remotely located control system 1004, may determine a display to transmit to the wearable system 1000 based upon one or more of the inputs received at 1204, the signals received at 1206, and the electronic representations received at 1208. Such displays may be related, for example, to navigation information for moving towards an objective location (e.g., location of an object to be retrieved). Such navigation information may include, for example, directional information (e.g., an arrow and "x" projected onto the ground) and/or safety information for moving towards the objective location (e.g., a flashing red "x"). In some implementations, such displays may include information about an object to be retrieved, such as handling information ("Fragile") and/or transporting information ("Heavy Load Team Lift"), and may be displayed along or proximate the object to be retrieved. Such displays may be provided at the wearable system 1000 by one or more components of the display subsystem 112.

At 1214, the processor-enabled device, such as, for example, the control system 118 and/or the remotely located control system 1004, may transmit the audio cue to the wearable system 1000, via, for example, the wireless communication subsystem 116.

At 1216, the processor-enabled device, such as, for example, the control system 118 and/or the remotely located control system 1004, may transmit the displays to the wearable system 1000, via, for example, the wireless communication subsystem 116.

At 1218, the method 1200 terminates, for example until invoked again. Alternatively, the method 1200 may repeat continuously or repeatedly, or may execute as multiple instances of a multi-threaded process.

Figure 13:
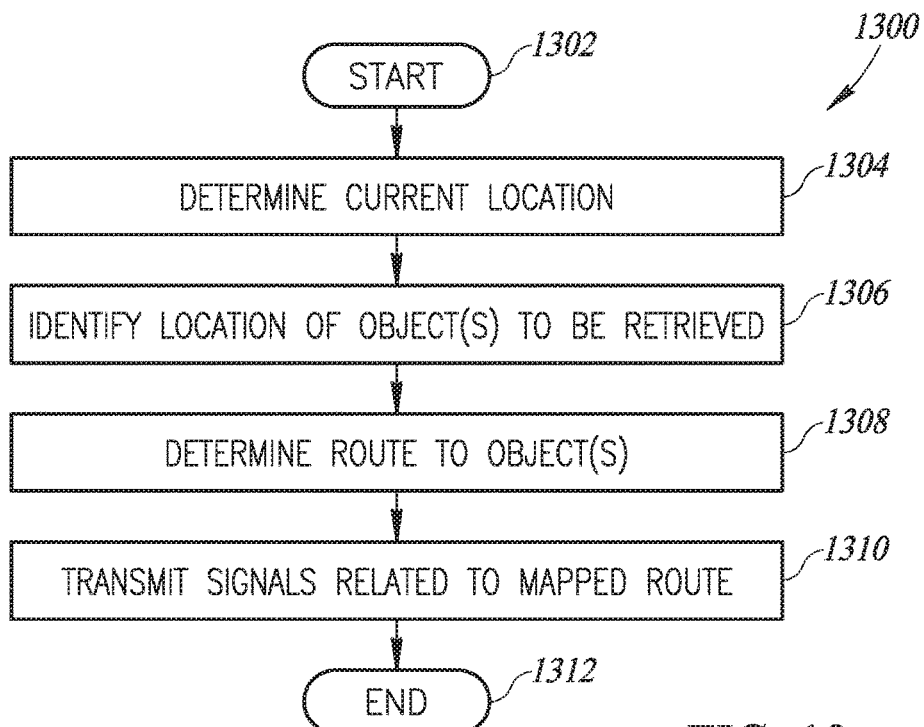
FIG. 13 is a logic flow diagram of a method of determining a route to retrieve one or more objects within an environment, according to at least one illustrated implementation.

FIG. 13 shows a method 1300 of determining a route to retrieve one or more objects within an environment, according to at least one illustrated implementation. The method 1300 starts at 1302, at which a processor enabled device, for example, the control system 118 and/or the remotely located control system 1004, activates the wearable system 1000.

At 1304, the processor enabled device, for example, the control system 118 and/or the remotely located control system 1004, may determine a current location for the wearable system 1000. In some implementations, the location information may be based upon the relative strength of communication signals transmitted from the antenna 136 in the wireless communications subsystem 116 associated with the wearable system 1000. In such an implementation, the location information may be based upon the signal strength of wireless transmissions received from the wireless communications subsystem 116 on the wearable system 1000 at a plurality of at least three wireless access points 908 by using well-known triangulation methods. In some implementations, additional systems and/or methods may be used to provide locations information regarding the wearable system 1000. For example, some implementations may include one or more RFID interrogators 912 at one or more locations within the environment in which the wearable system 1000 operates. In some implementations, such RFID interrogators 912 may be implemented using posts that flank the sides of passages or paths in the operational environment, and/or by mats that users may walk over. In some implementation, such mats may be incorporated into the floor of the operational environment so that such mats may be unnoticed by the users. The RFID interrogators 912 may energize the RFID transponders 207 in the identification module 206 that may be incorporated into one or more components of the wearable system 1000. Such RFID transponders 207 may emit a signal that may be detected by the RFID interrogators 912 and used to identify the location of the wearable system 1000 at that moment. Such location information that may be obtained via the RFID interrogators 912 may be used to update, modify, and/or correct the location information provided by other methods, such as, for example, triangulation using the wireless access points 908.

At 1306, the processor enabled device, for example, the control system 118 and/or the remotely located control system 1004, may identify the location and/or vicinity of the one or more objects to be retrieved. Such location information may be tracked as the objects enter and are moved about the environment in which the wearable system 1000 operates. For example, in some implementations, each object may bear a machine-readable symbol along one or more surfaces in which such machine-readable symbol may be scanned as the object enters a warehouse or shipping facility. The scanning of the machine-readable symbol associated with each object may be used to identify the facility at which the respective objects are currently located. In addition, the machine-readable symbol may be scanned when the object is moved between various locations within the warehouse or shipping facility to provide additional information regarding the location or general vicinity in which the object is located. As such, the processor-enabled device may obtain this location information for the object.

At 1308, the processor enabled device, for example, the control system 118 and/or the remotely located control system 1004, may determine a route (such as, for example, the mapped route 900) from the current location of the wearable system 1000 to the location or vicinity in which the one or more objects to be retrieved are located. In some implementations, the mapped route 900 may be determined based upon a shortest route and/or a shortest travel time analysis based upon the locations of each of the objects to be retrieved. In some implementations, the mapped route 900 may be determined such that the user will retrieve the heaviest and/or bulkiest item last, to reduce the amount of time that the user will need to travel with such an object. In some implementations in which objects are located on different floors, the mapped route 900 may reduce the amount of time traveling on conveyances (e.g. elevators, escalators) or stairs between floors. In some implementations, the mapped route 900 may have the user retrieve refrigerated and/or perishable food items last or towards the end of the mapped rout 900 to reduce the possibility of such food items spoiling. In some implementations, the mapped route 900 may be continuously updated and potentially modified when the user is in the midst of traveling the route 900. Such updates may be based, for example, upon changed conditions (e.g., an accident within the environment along or proximate the mapped route 900).

At 1310, the processor enabled device, for example, the control system 118 and/or the remotely located control system 1004, may transmit one or more signals to the wearable system 1000 related to the mapped route 900. The signals may be transmitted to the wearable system 1000 via the wireless network 1006 in at least some implementations. Such signals may result in one or more audio cues and/or visible displays being presented to the user via the user interface subsystem 106 and the display subsystem 112, respectively. Such audio cues and/or visible displays may facilitate the movement of the user along the mapped route 900.

At 1312, the method 1300 terminates, for example until invoked again. Alternatively, the method 1300 may repeat continuously or repeatedly, or may execute as multiple instances of a multi-threaded process.

Figure 14:
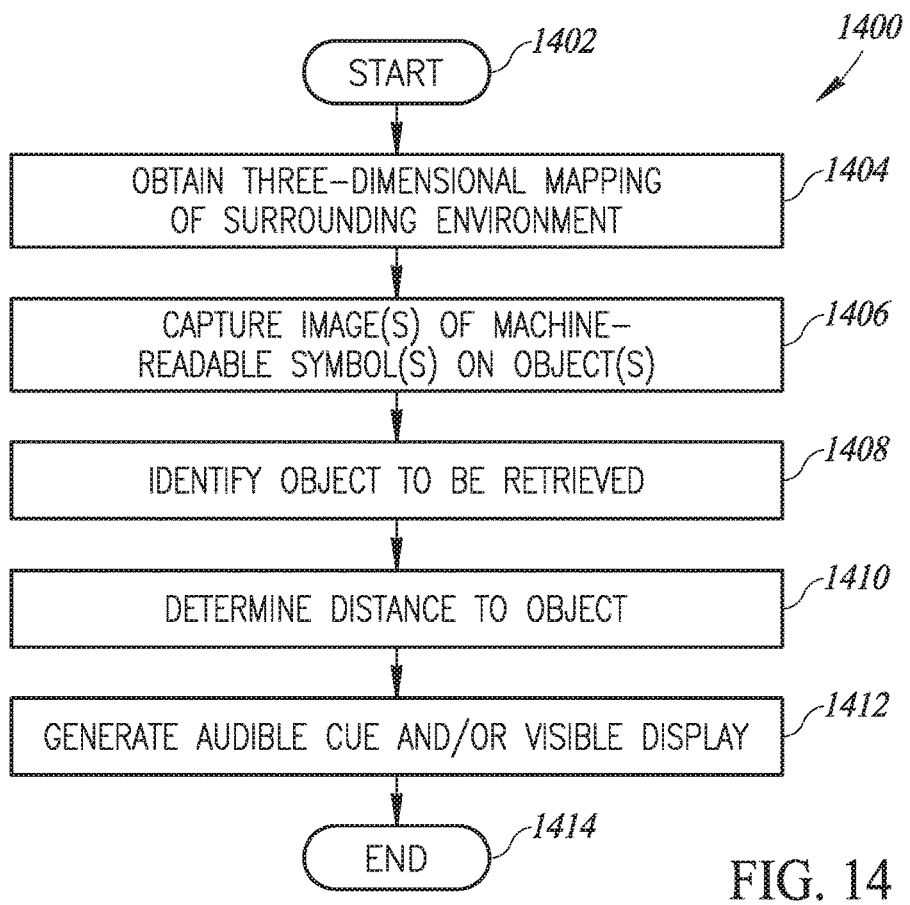
FIG. 14 is a logic flow diagram of a method of identifying an object to be retrieved within an environment, according to at least one illustrated implementation.

FIG. 14 shows of a method 1400 of identifying an object to be retrieved within an environment, according to at least one illustrated implementation. The method 1400 starts at 1402, at which a processor enabled device, for example, the control system 118 and/or the remotely located control system 1004, activates the wearable system 1000.

At 1404, the processor enabled device, such as the control system 118 and/or the remotely located control system 1104, may obtain a three-dimensional mapping of a portion of the environment surrounding the wearable system 1000. Such a three-dimensional mapping may be provided, for example, by a set of at least two image sensors 104 that may be separated by a distance. As such, corresponding images from each sensor 104 may be combined by the processor-enabled device to form a three-dimensional image of the environment surrounding the wearable system 1000.

At 1406, the processor enabled device, such as the control system 118 and/or the remotely located control system 1104, may capture images of machine-readable symbols that are located along one or more surfaces of the objects within the environment surrounding the wearable system 1000. In some implementations, such images may be captured by one or more of the image sensors 104 and/or by the machine-readable symbol reader 312. The machine-readable symbol may be used to encode information, such as information identifying the object bearing the machine-readable symbol. In such an implementation, the processor enable device may decode the machine-readable symbol to access this identifying information.

At 1408, the processor enabled device, such as the control system 118 and/or the remotely located control system 1104, may identify the object to be retrieved from the one or more objects that may be in the environment surrounding the wearable system 1000. In some implementations, the three-dimensional mapping from 1404 may be used to identify the object to be retrieved. As such, the three-dimensional mapping may be used to determine the dimensions of each of the objects within the surrounding environment, including a length 808, a width 810, and a height 812 of the object 804. The processor-enabled device may compare these determined dimensions with a set of stored dimensions related to the object to be retrieved. If the measured dimensions from the three-dimensional model match the stored dimensions, the processor-enabled device may identify the object as the one to be retrieved. In some implementations, the processor-enabled device may identify the object to be retrieved based upon the decoded information obtained from the machine-readable symbol. The processor-enabled device may compare the decoded information from the machine-readable symbol with a set of stored information associated with the object to be retrieved to identify (or confirm) the object to be retrieved.

At 1410, the processor enabled device, such as the control system 118 and/or the remotely located control system 1104, may determine the distance to the object to be retrieved. In some implementations, the distance may be determined based upon the three-dimensional mapping obtained at 1404. In some implementations, the distance may be determined using the range-finder 700. The range-finder 700 may be implemented by an emitter-collector pair that transmits a light, ultra-sonic, electromagnetic or other suitable signal towards the object to be retrieved using an emitter and detects the amount of time that lapses until at least a portion of the transmitted signal that has reflected or returned from the object is received at a collector. The signal may have a temporal or frequency or wavelength pattern imposed thereon, for example to facilitate detection of the returned signal from ambient signals. In some implementations, a proximity sensor, such as a capacitive, photoelectric, inductive, or Hall Effect sensor, may be used to detect the distance or a distance range of an object to the range-finder 700. In some implementations, for example, the range-finder 700 may detect the distance to the object to be retrieved based upon the amount of light that has been reflected from the object. The distance determined by the range-finder 700 may be used in conjunction with other components (e.g., the three dimensional representation provided by the image sensors 104) to more accurately determine the location of the object.

At 1412, the processor enabled device, such as the control system 118 and/or the remotely located control system 1104, may generate one or more of an audible cue and/or a visible display to identify the object to be retrieved. In some implementations, one or more of the transducers 108, 110 in the wearable system 1000 may be used to provide audible cues directing the user to the object to be retrieved. In some implementations, the light sources 114 in the display subsystem 112 may project a display 802 onto the object to be retrieved. In such an implementation, the display 802 may be an arrow that is placed onto the object to be retrieved. In some implementations, the display 802 may be a defined color and/or symbol, such as a green arrow, that may identify the object to be retrieved.

At 1414, the method 1400 terminates, for example until invoked again. Alternatively, the method 1400 may repeat continuously or repeatedly, or may execute as multiple instances of a multi-threaded process.

Figure 15:
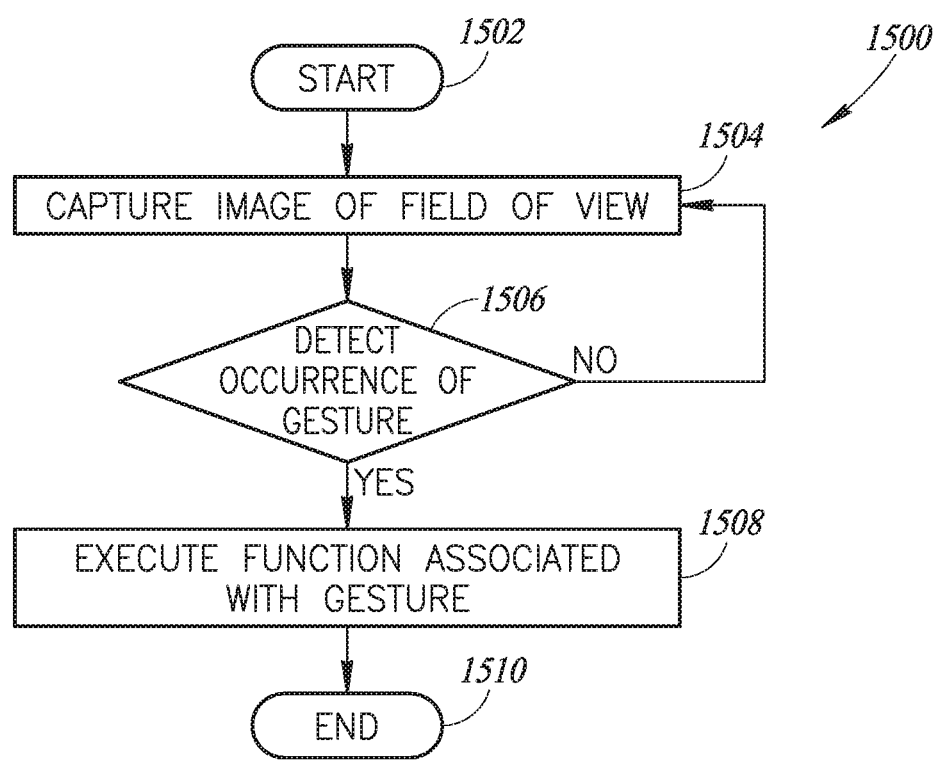
FIG. 15 is a logic flow diagram of a method that may be used to detect an occurrence of a gesture using a finger-mounted indicia and execute a function associated with the detected gesture, according to at least one illustrated implementation.

FIG. 15 shows a method 1500 that may be used to detect an occurrence of a gesture using a finger-mounted indicia 410 and execute a function associated with the detected gesture, according to at least one illustrated implementation. The method 1500 starts at 1502, at which a processor enabled device, for example the control system 118 and/or the remotely located control system 1004, activates one or more components on the wearable system 1000.

At 1504, the processor enabled device, for example the control system 118 and/or the remotely located control system 1004, may capture an image of a field of view using one or more image sensors 104. In some implementations, the image captured at 1504 may be part of a series of images captured by the image sensor 104. In such instances, the image sensor 104 may capture images at a defined rate over time such that the set of images may be comprised of a set of successive images. In some implementations, for example, the image sensor 104 may capture up to 30 images per second with each image having a QQVGA (Quarter Quarter Video Graphics Array) resolution of about 19200 pixels. In such an implementation, the image sensor 104 that captures the set of images at 1504 may have a relatively low power consumption. In some implementations, for example, the image sensor 104 may draw no more than 70 µW of power.

At 1506, the processor enabled device, for example the control system 118 and/or the remotely located control system 1004, determines if an occurrence of a gesture using the finger-mounted indicia 410 is detected. The occurrence of the gesture may be detected based upon the movements of an object, such as, for example, a hand and/or a glove that bears the finger-worn indicia 410, that is within the set of images captured at 1504. The gesture may be represented by a trace of a number of movements as depicted in the set of images. In some implementations, the processor enabled device may implement a gesture recognition policy 1120a to detect an occurrence of a gesture. In such an implementation, the gesture recognition policy 1120a may include one or more gestures and may associate one more movements with each gesture. In some implementations, the gesture recognition policy 1120a may associate one or more functions or processes with each defined gesture. As such, the processor enabled device may cause the associated functions or processes to be executed when the associated gestures is detected. If a gesture is not detected, the method 1500 may return to 1504 in which the imager captures another image. If a gesture is detected, the method 1500 proceeds to 1508.

At 1508, the processor enabled device, for example the control system 118 and/or the remotely located control system 1004, executes the function or process associated with the gesture detected at 1506. Such functions may include, for example, identifying a region of interest in which to search for a machine-readable symbol; adding a representation of an object associated with a detected machine-readable symbol to a virtual basket; removing a representation of an object associated with a detected machine-readable symbol from a virtual basket; requesting information regarding an object associated with a detected machine-readable symbol; defining a remote host to transmit captured, detected, and/or decoded information; and/or an additional, separate gesture to identify a communication channel (e.g., Bluetooth, Wi-Fi_33, ZigBee). Each of these functions may be associated with a separate gesture within the set of gestures. The set of gestures may be used to form a gesture recognition policy 1120a that may be executed by the processor enabled device. Once the function is executed, the method 1500 proceeds to 1510.

At 1510, the method 1500 terminates, for example until invoked again. Alternatively, the method 1500 may repeat continuously or repeatedly, or may execute as multiple instances of a multi-threaded process.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. U.S. patent application Ser. No. 15/847,710, entitled "Gesture Controllable Machine-Readable Symbol Reader Systems and Methods, with Head Worn Interface," and U.S. Provisional Patent Application No. 62/607,828, entitled "User-Wearable Systems and Methods to Collect Data and Provide Information," are incorporated herein by reference, in their entireties.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A system that provides navigation information to a user, the system which is mounted on one or more articles worn by the user, the system comprising:
   a communications subsystem including at least one antenna and at least one radio;
   a user interface subsystem including:
      at least one light source oriented to selectively render a display from the light source within a field of vision of the user;
   at least one image sensor which captures images of at least a portion of an environment in which at least a portion of the system operates and which provides electronic representations of the captured images;
   a pose determination subsystem including at least one of an accelerometer or a gyroscope, that at least one accelerometer and gyroscope which generate one or more signals indicative of at least one of a position or an orientation of the user; and
   a control system that communicatively couples to each of the communications subsystem, the user interface subsystem, the at least one image sensor, and the pose determination subsystem, the control system which:
      receives one or more signals via at least one of the communications subsystem, the at least one image sensor; and the pose determination subsystem;
      receives signals from a set of navigation beacons, each signal which is related to a transmission by the system, and determines a location of the system based at least in part on the received signals; and
      controls the user interface subsystem to render a changeable display within the environment in which at least a portion of the system operates, wherein the changeable display provides navigation information indicative of a direction of travel for the user through the environment in which at least a portion of the system operates and which are based at least in part on a combination of the received one or more signals of the pose determination subsystem and the one or more signals from the navigation beacons,
   wherein the user interface subsystem further comprises one or more modifiable directional components that modify a relative direction at which light is directed by the at least one light sources responsive to commands from the control system that are based, at least in part, on data from the pose determination system to maintain the changeable display in a desired location related to the navigation even as the system moves with the movement of the user.

2. The system of claim 1 wherein the at least one light source projects the display to impact objects within the environment in which at least a portion of the system operates.

3. The system of claim 1, further comprising:
   an augmented reality display that is positionable proximate one or both eyes of the user, wherein the at least one light source projects the display onto the augmented reality display.

4. The system claim 1 wherein at least some of the one or more signals received by the control system are received from at least one remote processor via the communications subsystem, wherein the at least one image sensor and the pose determination subsystem are communicatively coupled with the at least one remote processor via the communications subsystem, and wherein signals from at least one of the image sensor or the pose determination subsystem are transmitted to the at least one remote processor.

5. The system of claim 1 wherein the at least one image sensor includes two image sensors that are separated by a distance, in which each of the two image sensors captures a series of two-dimensional image of the environment in which at least a portion of the system operates, and wherein the control system further combines corresponding ones of the respective two-dimensional images captured by the two image sensors into a series of three-dimensional images of at least a portion of the environment in which at least a portion of the system operates.

6. The system of claim 5 wherein the control system determines dimensions of objects within the environment in which at least a portion of the system operates based at least in part on one or more of the three-dimensional images, and wherein the control system identifies an object to be retrieved based at least in part on the determined dimensions.

7. The system of claim 1, further comprising: an RFID transponder which emits a signal when energized by an RFID interrogator, wherein a current location of the system is determined based at least in part on the RFID transponder when the RFID transponder is energized by at least one RFID interrogator located in the environment in which the system is located.

8. The system of claim 1, further comprising: a machine-readable symbol reader which has a field-of-view that includes at least a portion of the environment in which at least a portion of the system operates, the machine-readable symbol reader which captures an electronic representation of one or more machine-readable symbols that are within the field-of-view of the machine-readable symbol reader, wherein the control unit further decodes the electronic representation of the one or more machine-readable symbols, at least one of the one or more machine-readable symbols which is borne by an object located in the environment in which at least a portion of the system operates, and further comprises the changeable display providing information regarding at least one object to be retrieved based at least in part on the decoded electronic representation.

9. The system of claim 1, wherein the user interface subsystem comprises a voice-control subsystem which receives the input from the at least one transducer, the input which includes at least one voice command from the user, and which converts the at least one voice command to text commands, and wherein the navigation information is based at least in part on the converted text commands.

10. The system of claim 1; further comprising; a time-of-flight sensor which generates a distance signal indicative of a distance from the time-of-flight sensor to a remote object, wherein the navigation information from the control subsystem is based at least in part on the distance signal generated by the time-of-flight sensor.

11. The system of claim 1, further comprising: a facial gesture recognition subsystem which includes at least one facial gesture image sensor oriented to obtain an electronic image of a human face, wherein the control system further determines a facial gesture based on the obtained electronic image of the human face and performs at least one defined function based at least in part on the determined facial gesture.

12. The system of claim 11 wherein the at least one defined function includes at least one of: capturing an image of a region of interest by the at least one image sensor, the region of interest which is within a field-of-view of the at least one image sensor; comparing a list of objects to be retrieved with one or more physical objects that have been retrieved by the user; or providing one or more commands for a remotely controlled vehicle.

13. The system of claim 1, further comprising: an eye tracking subsystem including at least eye tracking image sensor oriented to obtain images that include at least one eye of the user, wherein the control system determines a direction of orientation of the at least one eye, and wherein the control system controls the user interface subsystem to provide audible cues based at least in part on the determined direction of orientation of the at least one eye.

14. The system of claim 1, wherein the one or more modifiable directional components include a movable or modifiable mirror.

15. The system of claim 1, wherein the user interface subsystem further includes at least one audio transducer that provides audio cues to the user and that receives input from the user, and wherein the control system controls the user interface subsystem to provide the audio cues to the user that provide the navigation information.

16. A method of operation of a system that provides navigation information to a user moving through an environment, the system which is mounted on one or more articles worn by the user, the method comprising:
receiving from a user-wearable user interface subsystem one or more verbal inputs from the user;
receiving signals from a set of navigation beacons, each signal which is related to a transmission by the system;
determining a location of the system based at least in part on the received signals;
receiving from a pose determination subsystem one or more signals indicative of at least one of a position or an orientation of the user;
receiving one or more electronic representations of images that have been captured by the image sensor, the images being of an environment in which at least a portion of the system operates;
rendering a changeable display within a field of vision of the user via at least one light source;
determining one or more audio cues for the user based at least in part upon one or more of the one or more verbal inputs received from the user-wearable user interface subsystem, the one or more signals received from the pose determination subsystem, and the one or more electronic representations of captured images; and
transmitting the one or more audio cues to the user-wearable user interface subsystem and updating the changeable display, the audio cues and the changeable display which provide navigation information indicative of a direction of travel for the user through the environment in which at least a portion of the system operates and which are based at least in part on a combination of the received one or more signals of the pose determination subsystem and the one or more signals from the navigation beacons;
modifying, via one or more modifiable directional components of the user-wearable user interface subsystem further, a relative direction at which light is directed by the at least one light sources responsive to commands from the control system that are based, at least in part, on data from the pose determination system to maintain the changeable display in a desired location related to the navigation even as the system moves with the movement of the user.

17. The method of claim 16, further comprising:
determining location information regarding a location of at least one object to be retrieved; and
determining route information regarding a route to the location of the at least one object.

18. The method of claim 16, further comprising:
capturing by the at least one image sensor images of at least one finger-worn indicia that is wearable on a finger of the user;
detecting an occurrence of a first gesture represented by a trace of a number of movements of the at least one finger-worn indicia in the captured images; and
in response, to detecting the occurrence of the first gesture, executing at least one defined function.

19. The method of claim 16, further comprising:
receiving a signal from a transponder attached to at least one wearable safety item; and
transmitting one or more signals that cause at least one safety action, the transmitting of the one or more signals which is based at least in part on an absence of the signal from the transponder attached to the at least one wearable safety item, wherein transmitting one or more signals that result in at least one safely action being performed includes performing at least one of: preventing access to the user to at least a portion of the environment in which at least a portion of the system operates; or generating an audio cue via the user interface subsystem.

20. The method of claim 19, further comprising:
receiving signals from one or more objects proximate the system including receiving signals from at least one moveable object;
transmitting one or more signals to the system based upon the one or more objects proximate the system; and
transmitting one or more signals to the at least one movable object that causes the at least one moveable objects to change at least one of a velocity or a direction of travel.

* * * * *